United States Patent
Nakao

(10) Patent No.: US 7,965,784 B2
(45) Date of Patent: *Jun. 21, 2011

(54) CONTROL METHOD AND RADIO APPARATUS UTILIZING THE SAME

(75) Inventor: Seigo Nakao, Gifu (JP)

(73) Assignee: Sanyo Electric Co., Ltd., Osaka (JP)

( * ) Notice: Subject to any disclaimer, the term of this patent is extended or adjusted under 35 U.S.C. 154(b) by 998 days.

This patent is subject to a terminal disclaimer.

(21) Appl. No.: 11/388,211

(22) Filed: Mar. 24, 2006

(65) Prior Publication Data

US 2006/0229021 A1    Oct. 12, 2006

(30) Foreign Application Priority Data

Mar. 24, 2005 (JP) .................. 2005-085920

(51) Int. Cl.
*H04B 7/02* (2006.01)
(52) U.S. Cl. ........ 375/267; 375/219; 375/316; 375/295; 375/259; 455/68; 455/115.1; 455/562.1
(58) Field of Classification Search .................. 375/267, 375/219, 316, 295, 259; 455/68, 115.1, 562.1
See application file for complete search history.

(56) References Cited

U.S. PATENT DOCUMENTS

| | | | | |
|---|---|---|---|---|
| 7,715,876 B2* | 5/2010 | Nakao | ......................... | 455/562.1 |
| 7,715,877 B2* | 5/2010 | Nakao | ......................... | 455/562.1 |
| 7,715,878 B2* | 5/2010 | Nakao | ......................... | 455/562.1 |
| 7,715,879 B2* | 5/2010 | Nakao | ......................... | 455/562.1 |
| 7,715,880 B2* | 5/2010 | Nakao | ......................... | 455/562.1 |
| 7,738,924 B2* | 6/2010 | Nakao | ......................... | 455/562.1 |
| 2002/0181509 A1* | 12/2002 | Mody et al. | .................... | 370/480 |
| 2005/0152314 A1* | 7/2005 | Sun et al. | ........................ | 370/334 |
| 2005/0180353 A1* | 8/2005 | Hansen et al. | ................. | 370/328 |
| 2005/0180360 A1* | 8/2005 | Hansen et al. | ................. | 375/267 |
| 2005/0195733 A1* | 9/2005 | Walton et al. | .................. | 370/208 |
| 2006/0002361 A1* | 1/2006 | Webster et al. | ................ | 370/343 |
| 2006/0165191 A1* | 7/2006 | Lin et al. | ........................ | 375/267 |
| 2007/0253324 A1* | 11/2007 | Ma et al. | ........................ | 370/208 |

FOREIGN PATENT DOCUMENTS

| | | |
|---|---|---|
| JP | 2004-297172 | 10/2004 |
| JP | 2004-297750 | 10/2004 |

OTHER PUBLICATIONS

Coleri, S., et al. "Channel Estimation Techniques Based on Pilot Arrangement in OFDM Systems" IEEE Transactions on Broadcasting, Sep. 2002, vol. 48, No. 3, pp. 223-229.
Japanese Notification of Reasons for Refusal, with English translation thereof, issued in Japanese Patent Application No. 2005-085920, dated Feb. 23, 2010.
S. A. Mujtaba, "TGn Sync Complete Proposal," IEEE 802.11-04/888r4 (IEEE, Nov. 2004), Slides 1, and 45-48.
Japanese Notification of Reason(s) for Refusal, w/ English translation thereof, issued in Japanese Patent Application No. JP 2005-085920 dated Jun. 22, 2010.

* cited by examiner

*Primary Examiner* — Shuwang Liu
*Assistant Examiner* — Kenneth Lam
(74) *Attorney, Agent, or Firm* — McDermott Will & Emery LLP

(57) ABSTRACT

A processing unit transmits, from at least one of a plurality of antennas, data corresponding respectively to the plurality of antennas. A control unit generates a request signal with which to have a second radio apparatus provide information on rates at the second radio apparatus. When transmitting the request signal, the processing unit also transmits known signals corresponding respectively to the plurality of antennas, from the plurality of antennas containing an antenna to transmit data.

10 Claims, 24 Drawing Sheets

FIG.3A

| LegacySTS | LegacyLTS | Legacy SIGNAL | MIMO SIGNAL | 1st MIMO-STS | 1st MIMO-LTS | 1st DATA |

| | | | | 2nd MIMO-STS | 2nd MIMO-LTS | 2nd DATA |

FIG.3B

| LegacySTS | LegacyLTS | Legacy SIGNAL | MIMO SIGNAL | 1st MIMO-STS | 1st MIMO-LTS | 1st DATA |

| | | | | 2nd MIMO-STS | 2nd MIMO-LTS | 2nd DATA |

| | | | | 3rd MIMO-STS | 3rd MIMO-LTS | |

| | | | | 4th MIMO-STS | 4th MIMO-LTS | |

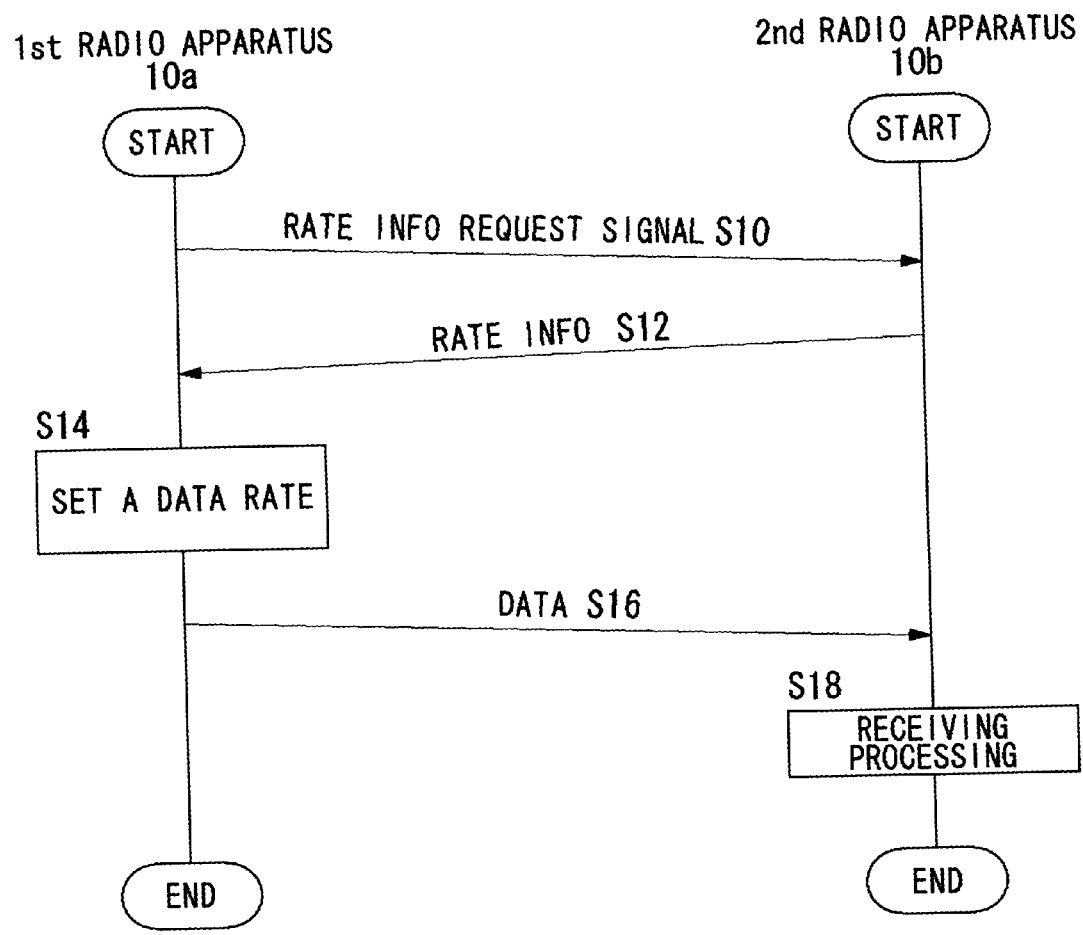

FIG.24

| L-STS | L-LTS L-SIGNAL | MIMO-SIGNAL | 1st MIMO-STS' | 1st MIMO-LTS(1)' | 1st MIMO-LTS(2)' | 1st MIMO-LTS(3)' | 1st DATA' |
|---|---|---|---|---|---|---|---|
| | | | 2nd MIMO-STS' | 2nd MIMO-LTS(1)' | 2nd MIMO-LTS(2)' | 2nd MIMO-LTS(3)' | 2nd DATA' |
| | | | 3rd MIMO-STS' | 3rd MIMO-LTS(1)' | 3rd MIMO-LTS(2)' | 3rd MIMO-LTS(3)' | 3rd DATA' |

CONTROL METHOD AND RADIO APPARATUS UTILIZING THE SAME

BACKGROUND OF THE INVENTION

1. Field of the Invention

The present invention relates to controlling technologies, and it particularly relates to a control method at the time when the signals are transmitted from a plurality of antennas and the signals are received by a plurality of antennas, and relates also to a radio apparatus utilizing said method.

2. Description of the Related Art

An OFDM (Orthogonal Frequency Division Multiplexing) modulation scheme is one of multicarrier communication schemes that can realize the high-speed data transmission and are robust in the multipath environment. This OFDM modulation scheme has been used in the wireless standards such as IEEE802.11a/g and HIPERLAN/2. The burst signals in such a wireless LAN are generally transmitted via a time-varying channel environment and are also subject to the effect of frequency selective fading. Hence, a receiving apparatus generally carries out the channel estimation dynamically.

In order for the receiving apparatus to carry out the channel estimation, two kinds of known signals are provided within a burst signal. One is the known signal, provided for all carries in the beginning of the burst signal, which is the so-called preamble or training signal. The other one is the known signal, provided for part of carriers in the data area of the burst signal, which is the so-called pilot signal (See Reference (1) in the following Related Art List, for instance).

Related Art List (1) Sinem Coleri, Mustafa Ergen, Anuj Puri and Ahmad Bahai, "Channel Estimation Techniques Based on Pilot Arrangement in OFDM Systems", *IEEE Transactions on broadcasting, vol.* 48, No. 3, pp. 223-229, September 2002.

In wireless communications, adaptive array antenna technology is one of the technologies to realize the effective utilization of frequency resources. In adaptive array antenna technology, the amplitude and phase of signals transmitted from and received by a plurality of antennas, respectively, are so controlled as to form a directional pattern of the antenna (hereinafter such a directional pattern will be referred to as "adaptive pattern"). One of techniques to realize higher data transmission rates by using such an adaptive array antenna technology is the MIMO (Multiple-Input Multiple-Output) system. In this MIMO system, a transmitting apparatus and a receiving apparatus are each equipped with a plurality of antennas, and a channel corresponding to each of the plurality of antennas is set. That is, channels up to the maximum number of antennas are set for the communications between the transmitting apparatus and the receiving apparatus so as to enhance the data transmission rates. Moreover, combining this MIMO system with a technique such as the OFDM modulation scheme results in a higher data transmission rate.

In the MIMO system, the data rate can also be adjusted by increasing the number of antennas to be used for data communications. Furthermore, the data rate can be adjusted in greater detail by applying the adaptive modulation to the MIMO system. To perform such an adjustment of data rates more reliably it is desired that the transmitting apparatus already acquire from the receiving apparatus the information on data rates suited for the radio channel between the transmitting apparatus and the receiving apparatus (hereinafter referred to as "rate information"). If, on the other hand, the rate information is not transmitted on a regular basis in the MIMO system, the transmitting apparatus transmits to the receiving apparatus a signal by which to request the transmission of the rate information (hereinafter referred to as "rate request signal").

Examples of the combinations of directivity patterns in the transmitting apparatus and receiving apparatus in a MIMO system are as follows. One example is a case where the antennas of a transmitting apparatus have omni patterns and the antennas of a receiving apparatus have patterns in adaptive array signal processing. Another example is a case where both the antennas of the transmitting apparatus and those of the receiving apparatus have patterns in adaptive array signal processing. The system can be simplified in the former case. In the latter case, however, the directivity patterns of antennas can be controlled in greater detail, so that the characteristics thereof can be improved. Since in the latter case the transmitting apparatus performs adaptive array signal processing for transmission, the known signals used to estimate channels provided beforehand from the receiving apparatus. To improve the accuracy of controlling the adaptive array antennas, it is desirable that the transmitting apparatus acquire the respective channel characteristics between a plurality of antennas included in the transmitting apparatus and those in the receiving apparatus. For this reason, the receiving apparatus transmits from all of the antennas the known signals for channel estimation. Hereinafter, the known signals, for use with channel estimation, transmitted from a plurality of antennas will be called "training signals" independently of the number of antennas to be used for data communication.

Under these circumstances, the inventor of the present invention came to recognize the following problems to be solved. If any error is contained in the rate information determined by the receiving apparatus, an error will be caused in communications by a MIMO system and therefore the transmission quality and effective data rate will be lowered. In order to raise the effective data rate, it is desired that the transmission of signals other than the data, for example, the rate request signal or training signals, be minimized. When the number of antennas that transmit the training signals increases abruptly as compared with the number of antennas that transmit the data, the signal strength also increases. As a result, the signals may suffer distortion when the receiving apparatus receives the training signals.

SUMMARY OF THE INVENTION

The present invention has been made in view of the foregoing circumstances and a general object thereof is to provide a controlling method by which to improve control accuracy in transmitting data.

In order to solve the above problems, a radio apparatus according to a preferred embodiment of the present invention comprises: a receiver which receives, from a radio apparatus to be communicated, a burst signal in which data of at least one stream is assigned to a posterior part and known signals of streams the number of which is larger than the number of streams for data are assigned to an anterior part; an acquiring unit which acquires, based on the burst signal received by the receiver, the number of streams in which known signals are assigned; a decision unit which determines rate information in a range of the number of streams acquired by the acquiring unit; and a notification unit which notifies the radio apparatus to be communicated of the rate information determined by the decision unit.

A "known" signal is a signal used to estimate the channel characteristics of a radio apparatus to be communicated. A signal for setting AGC in the radio apparatus to be communicated may be contained in the "known" signal or may not be contained therein.

According to this embodiment, the rate information such as the number of streams for data receivable is determined within the range of the number of streams to which a known signal is assigned. Hence, for example, the sudden increase in the number of streams for data is restricted and the possibility that the increase in the number of streams for data fails can be prevented.

In the burst signal received by the receiver, the number of streams to which the known signals are assigned may be so defined as to be greater than that to which the data are assigned, by a predetermined value, and the number of streams to which the known signals are assigned may be so defined as to increase and decrease according to increase and decrease of the number of streams to which the data are assigned. In such a case, the number of streams to which the known signals are assigned is related, under a predetermined relationship, to the number of streams to which the data are assigned. Thus, the difference in signal strength between the known signal and the data can be made smaller and the deterioration of received signals can be prevented.

The radio apparatus may further comprise a derivation unit which derives a quality of the burst signal received by the receiver. The decision unit may determine the rate information, based on the quality derived by the derivation unit, in a manner such that the number of streams acquired by the acquiring unit is the upper limit value.

Another preferred embodiment of the present invention relates also to a radio apparatus. This apparatus comprises: a transmitter which transmits, to a radio apparatus to be communicated, a burst signal in which data of at least one stream is assigned to a posterior part and known signals of streams the number of which is larger than the number of streams for data are assigned to an anterior part; a receive unit which receives, from the radio apparatus to be communicated, notification on rate information; a decision unit which determines, based on the notification received by the receive unit, the number of streams to which data are assigned and the number of streams to which known signals are assigned; and a generator which generates a burst signal based on a decision made by the decision unit and outputs the generated burst signal to the transmitter.

According to this embodiment, for example, the number of streams to which data are assigned and the number of streams to which known signals are assigned are determined based on the notification received by the receive unit. Hence, the abrupt increase in the number of streams for data is restricted and the possibility that the increase in the number of streams for data fails can be restricted.

In the decision unit, the number of streams to which the known signals are assigned may be so defined as to be larger, by a predetermined number, than the number of streams to which the data are assigned, and after the number of streams to which the data are assigned is determined based on the notification received by the receive unit, the number of streams to which the known signals are assigned may be determined by adding a predetermined value to the number of streams to which the data are assigned. In this case, the number of streams to which the known signals are assigned is related, under a predetermined relationship, to the number of streams to which the data are assigned. Thus, the difference in signal strength between the known signal and the data can be made smaller and the deterioration of received signals can be prevented.

Still another preferred embodiment of the present invention relates to a control method. This method is a control method in a case when a burst signal in which data of at least one stream is assigned to a posterior part and known signals of streams the number of which is larger than the number of streams for data are assigned to an anterior part is received from a radio apparatus to be communicated. And the number of streams to which known signals are assigned is acquired based on the received burst signal received, then the rate information such as the number of streams for data receivable is determined within a range of the number of streams acquired by the acquiring, and the rate information, such as the number of streams, determined by the determining is notified to the radio apparatus to be communicated.

Still another preferred embodiment of the present invention relates also to a control method. This method is a control method in a case when a burst signal in which data of at least one stream is assigned to a posterior part and known signals of streams the number of which is larger than the number of streams for data are assigned to an anterior part is transmitted to a radio apparatus to be communicated. And notification on rate information such as the number of streams for data receivable is received from the radio apparatus to be communicated, then the number of streams to which data are assigned and the number of streams to which known signals are assigned are determined based on the notification received by the receive unit, and a burst signal is generated.

Still another preferred embodiment of the present invention relates also to a control method. This method comprises: receiving, from a radio apparatus to be communicated, a burst signal in which data of at least one stream is assigned to a posterior part and known signals of streams the number of which is larger than the number of streams for data are assigned to an anterior part; acquiring, based on the burst signal received by the receiving, the number of streams to which known signals are assigned; determining rate information in a range of the number of streams acquired by the acquiring; and notifying the radio apparatus to be communicated of the rate information determined by the determining.

In the burst signal received by the receiving, the number of streams to which the known signals are assigned may be so defined as to be greater than that to which the data are assigned, by a predetermined value, and the number of streams to which the known signals are assigned is so defined as to increase and decrease according to increase and decrease of the number of streams to which the data are assigned. The receiving may further include deriving a quality of the burst signal received by the receiving, and the determining may be such that the rate information is determined, based on the quality derived by the deriving, in a manner such that the number of streams acquired by the acquiring is the upper limit value.

Still another preferred embodiment of the present invention relates also to a control method. This method comprises: transmitting, to a radio apparatus to be communicated, a burst signal in which data of at least one stream is assigned to a posterior part and known signals of streams the number of which is larger than the number of streams for data are assigned to an anterior part; receiving, from the radio apparatus to be communicated, notification on rate information; determining, based on the notification received by the receiving, the number of streams to which data are assigned and the number of streams to which known signals are assigned; and generating a burst signal based on a decision made by the determining and outputting the generated burst signal to the transmitting.

In the determining, the number of streams to which the known signals are assigned may be so defined as to be larger, by a predetermined number, than the number of streams to which the data are assigned, and after the number of streams to which the data are assigned is determined based on the notification received by the receiving, the number of streams to which the known signals are assigned may be determined by adding a predetermined value to the number of streams to which the data are assigned.

Data may be composed of a plurality of streams. A known signal may be composed of a plurality of streams. A control signal may be composed of a plurality of streams.

It is to be noted that arbitrary combinations of the aforementioned constituting elements and the implementations of the invention in the form of method, apparatus, system, computer program, data structure and so forth are effective as and encompassed by the embodiments of the present invention.

BRIEF DESCRIPTION OF THE DRAWINGS

Embodiments will now be described by way of examples only, with reference to the accompanying drawings which are meant to be exemplary, not limiting and wherein like elements are numbered alike in several Figures in which:

FIGS. 3A and 3B show each a structure of burst format in the communication system of FIG. 2;

FIG. 4 shows a sequence of communication procedure to be compared in the communication system of FIG. 2;

FIG. 24 illustrate a burst format modified over the burst formats of FIG. 19A to 19C.

DETAILED DESCRIPTION OF THE INVENTION

Figure 1:
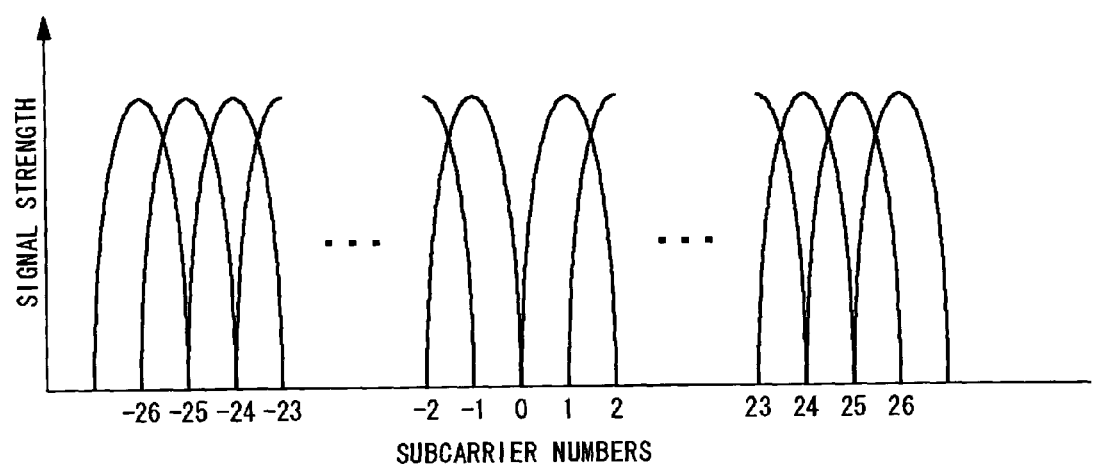
FIG. 1 illustrates a spectrum of a multicarrier signal according to an embodiment of the present invention.

The invention will now be described by reference to the preferred embodiments. This does not intend to limit the scope of the present invention, but to exemplify the invention.

An outline of the present invention will be given before a detailed description thereof. Embodiments of the present invention relate to a MIMO system comprised of two radio apparatuses (for convenience, hereinafter referred to as "first radio apparatus" and "second radio apparatus"). Both the first radio apparatus and the second radio apparatus in a MIMO system carry out adaptive array signal processing. The MIMO system changes data transmission rates by varying respectively the number of antennas, the mode of modulation scheme and the value of coding rate for error correction. In so doing, a radio apparatus at the transmission side sends a rate request signal to a radio apparatus at the receiving side. For example, if the first radio apparatus transmits data to the second radio apparatus, the first radio apparatus will send the rate request signal to the second radio apparatus.

The second radio apparatus conveys the rate information of its own to the first radio apparatus. However, said rate information contains errors in the following cases. The first example is a case where some period of time is required and spent after the second radio apparatus has determined the rate information. The second example is a case where the number of antennas used for the transmission in the first radio apparatus differs between when the second radio apparatus has determined the rate information and when it receives the data from the first radio apparatus. Specific explanation about these cases will be deferred until later. When transmitting the rate request signal, the first radio apparatus also appends a training signal in order to obtain information that is as accurate as possible from the second radio apparatus. As a result thereof, the second radio apparatus can update the rate information by the use of the training signal, so that the rate information is very accurate.

When the data are to be transmitted from the first radio apparatus to the second radio apparatus, the first radio apparatus must derive, in advance, transmission weight vectors based on the training signal. For this reason, the first radio apparatus requests the second radio apparatus to send the training signal (hereinafter, the signal for this request will be referred to as "training request signal"). In accordance with this training request signal, the second radio apparatus transmits the training signal to the first radio apparatus. At this time, instead of transmitting the training signal from all of the antennas in the second radio apparatus, the second radio apparatus sends the training signal from an antenna or antennas that should receive data from the first radio apparatus, to reduce the power consumption.

If the number of antennas that transmit the training signal is larger than the number of antennas that transmit data, there may be cases where the data suffers errors and/or the accuracy in estimation the channel characteristics deteriorates in the receiving side. If in the receiving side the gain of AGC is set in accordance with the power of the training signal, there is a possibility that the amplification for data will be insufficient and the error will be caused in the data. Also, if in the receiving side the gain of AGC is set in accordance with the power of the data, there is a possibility that the distortion will be caused in the data during the estimation of channel characteristics. For these reasons, in the first and the second radio apparatus according to the present embodiments (hereinafter these will be generically referred to as "radio apparatus") the number of antennas that transmit the training signal is so set as to be a greater by one than the number of antennas that transmit the data. The number of antennas that transmit the training signal is raised by gradually increasing the number of antennas that transmit the data.

FIG. 1 illustrates a spectrum of a multicarrier signal according to an embodiment of the present invention. In particular, FIG. 1 shows a spectrum of a signal in the OFDM modulation scheme. One of a plurality of carriers in an OFDM modulation scheme is generally called a subcarrier. Herein, however, each of the subcarriers is designated by a "subcarrier number". Similar to the IEEE 802.11a standard, 53 subcarriers, namely, subcarrier numbers "−26" to "26" are defined herein. It is to be noted that the subcarrier number "0" is set to null so as to reduce the effect of a direct current component in a baseband signal. The respective subcarriers are modulated by a modulation scheme which is set variably. Used here is any of modulation schemes among BPSK (Binary Phase-Shift Keying), QPSK (Quadrature Phase-Shift Keying), 16-QAM (Quadrature Amplitude Modulation) and 64-QAM.

Convolutional coding is applied, as an error correction scheme, to these signals. The coding rates for the convolutional coding are set to 1/2, 3/4 and so forth. The number of antennas used in a MIMO system is set variably. As a result, when the mode or values corresponding to the modulation scheme, coding rate and the number of antennas are set variably, the data rate is also set variably. Hereinafter, the information on data rates will be referred to as "rate information" as mentioned already, and the rate information contains values corresponding respectively to the modulation scheme, coding rate and the number of antennas. Unless otherwise particularly necessary, the description on values of the modulation scheme, coding rate and the number of antennas will not be given herein.

Figure 2:
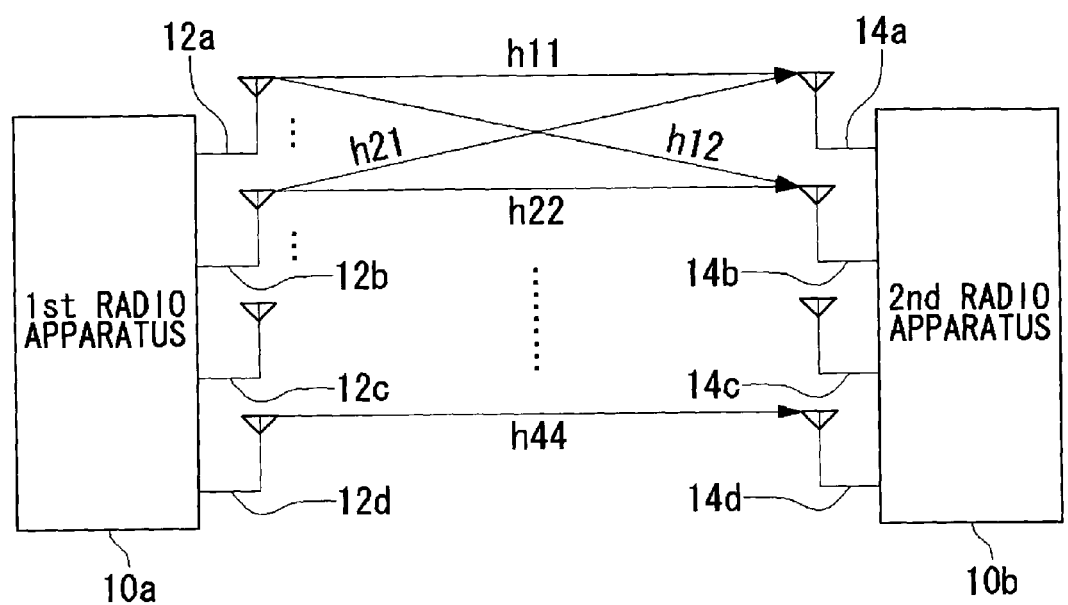
FIG. 2 illustrates a structure of a communication system according to an embodiment of the present invention.

FIG. 2 illustrates a structure of a communication system 100 according to an embodiment of the present invention. The communication system 100 includes a first radio apparatus 10a and a second radio apparatus 10b, which are generically called "radio apparatus 10". The first radio apparatus 10a includes a first antenna 12a, a second antenna 12b, a third antenna 12c and a fourth antenna 12d, which are generically referred to as "antenna 12", and the second radio apparatus 10b includes a first antenna 14a, a second antenna 14b, a third antenna 14c and a fourth antenna 14d, which are generically referred to as "antenna 14". One of the first radio apparatus 10a and the second radio apparatus 10b corresponds to a transmitting apparatus, whereas the other corresponds to a receiving apparatus. One of the first radio apparatus 10a and the second radio apparatus 10b corresponds to a base station apparatus, whereas the other corresponds to a terminal apparatus.

An outline of a MIMO will be given before a description of a structure of the communication system 100. Assume herein that data are being transmitted from the first radio apparatus 10a to the second radio apparatus 10b. The first radio apparatus 10a transmits different data from the first antenna 12a to fourth antenna 12d, respectively. As a result, the data rate becomes higher. The second radio apparatus 10b receives the data by the first antenna 14 to fourth antenna 14d. The second radio apparatus 10b separates the received signals by adaptive array signal processing and demodulates independently the signals transmitted from the first antenna 12a to fourth antenna 12b, respectively.

Since the number of antennas 12 is "4" and the number of antennas 14 is also "4", the number of combinations of channels between the antennas 12 and the antennas 14 is "16". The channel characteristic between from the ith antenna 12i to the jth antenna 14j is denoted by $h_{ij}$. In FIG. 2, the channel characteristic between the first antenna 12a and the first antenna 14a is denoted by $h_{11}$, that between the first antenna 12a and the second receiving antenna 14b by $h_{12}$, that between the second antenna 12b and the first antenna 14a by $h_{21}$, that between the second antenna 12b and the second antenna 14b by $h_{22}$, and that between the fourth antenna 12d and the fourth antenna 14d by $h_{44}$. For the clarity of illustration, it is omitted to show the other channels in FIG. 2.

The second radio apparatus 10b operates so that data transmitted by the first antenna 12a and the second antenna 12b, respectively, are demodulated independently by adaptive array signal processing. The first radio apparatus 10a also performs adaptive array signal processing on the first antenna 12a to the fourth antenna 12d. In this manner, the adaptive array signal processing is performed also at the transmitting side, namely, by the first radio apparatus 10a, so that the space division in a MIMO system is ensured. As a result, the interference of signals transmitted by a plurality of antennas 12 becomes smaller, so that the data transmission characteristics can be improved.

The first radio apparatus 10a transmits different data respectively from the first antenna 12a to fourth antenna 12d. The first radio apparatus 10a controls the number of antenna 12a to be used, in response to the rate or capacity of data to be transmitted. For instance, if the volume of data is larger, "four" antennas 12 are used, whereas if the volume of data is small, "two" antennas 12 are used. When the first radio apparatus 10a decides on the number of antennas 12 to be used, the rate information in the second radio apparatus 10b, is referred to. For instance, when the receiving by "two" antennas 14 is instructed from the second radio apparatus 10b, the first radio apparatus 10a uses "two" antennas 12. When the first radio apparatus 10a transmits data, it performs adaptive array signal processing on the antennas 12. As a result, the first radio apparatus 10a receives beforehand a training signal from the second radio apparatus 10b and derives transmission weight vectors based on the training signal. The details will be described later.

The first radio apparatus 10a may define at least one stream as one data, and may carry out transmission from a plurality of antennas 12 while the number of streams is being extended to the number of a plurality of antennas 12 by use of a steering matrix described later. Here, the data which are to undergo the processing using the steering matrix is called "streams". The data per se that correspond respectively to a plurality of antennas 12 are also called "streams". Known signals such as training signals may be contained in the streams. Each known signal contained in the training signals may also be defined as "stream".

The second radio apparatus 10b performs adaptive array signal processing on the first antenna 14a to fourth antenna 14d and then receives data from the first radio apparatus 10a. As described earlier, the second radio apparatus 10b conveys the rate information and transmits the training signal to the first radio apparatus 10a. It is to be noted that the operations by the first radio apparatus 10a and the second apparatus 10b may be reversed.

FIGS. 3A and 3B show each a structure of burst format in a communication system 100. FIG. 3A shows a burst format when the number of antennas 12 used is "2". The upper row of FIG. 3A shows a burst signal transmitted from the first antenna 12a whereas the lower row thereof shows a burst signal transmitted from the second antenna 12b. "Legacy STS (Short Training Sequence)", "Legacy LTS (Long Training Sequence)" and "Legacy Signal" are signals compatible with a communication system, such as a wireless LAN system that conforms to the IEEE802.11a standard, which is not compatible with a MIMO. "Legacy STS" is used for timing synchronization, AGC (Automatic Gain Control) and the like, "Legacy LTS" is used for channel estimation and "Legacy Signal" contains control information. "MIMO Signal" and the signals assigned posterior to this "MIMO Signal" are those characteristic of and inherent to a MIMO system, and the "MIMO Signal" contains control information corresponding to a MIMO system. "First MIMO-STS" and the "Second MIMO-STS" are used for timing synchronization, AGC and the like, "First MIMO-LTS" and "Second MIMO-LTS" are used for channel estimation, and "First Data" and the "Second Data" are data to be transmitted.

Similar to FIG. 3A, FIG. 3B shows a burst format at the time when "two" antennas 12 are used for data transmission. In FIG. 3B, however, the above-described training signals are appended. In FIG. 3B, the training signals correspond to "First MIMO-STS", "First MIMO-LTS" through "Fourth MIMO-STS" and "Fourth MIMO-LTS". The "First MIMO-STS", "First MIMO-LTS" through "Fourth MIMO-STS" and "Fourth MIMO-LTS" are transmitted from the first antenna 12 to fourth antenna 12d, respectively. As mentioned earlier, the number of antennas 12 from which the training signals are transmitted may be less than "4". "First MIMO-STS" to "Fourth MIMO-STS" are structured by patterns such that the interference among them becomes small. The same is true for "First MIMO-LTS" to "Fourth MIMO-LTS". The explanation of these structures thereof is omitted here. Though it may be generally a case that "Legacy LTS", "First MIMO-LTS" and the like in FIG. 3A are called training signals, the training signals defined in this patent specification are restricted to the aforementioned training signals as shown in FIG. 3B. That is, "training signals" correspond to "MIMO-LTSs" having multiple streams the number of which corresponds to channels to be estimated, in order for a targeted radio apparatus 10 to estimate the channels, independently of the number of data to be transmitted, namely, the number of streams. Hereinafter, the "First MIMO-STS" to "Fourth MIMO-STS" are generically referred to as "MIMO-STS" or "MIMO-STSs" and the "First MIMO-LTS" to "Fourth MIMO-LTS" are generically referred to as "MIMO-LTS" or "MIMO-LTSs", whereas "First Data" and "Second Data" are generically referred to as "Data".

FIG. 4 shows a sequence of communication procedure to be compared in a communication system 100. Shown here is an operation in which the first radio apparatus 10a acquires information on rates of the second radio apparatus 10b. For the brevity of explanation, the operation for adaptive array signal processing is omitted here. The first radio apparatus 10a sends a rate request signal to the second radio apparatus 10b (S10). The second radio apparatus 10b sends rate information to the first radio apparatus 10a (S12). The first radio apparatus 10a sets a data rate, based on the rate information (S14). That is, the data rate is set by referring to the rate information. The first radio apparatus 10a transmits data at the data rate thus set (S16). The second radio apparatus 10b performs a receiving processing on the data (S18).

According to the above-described operation, the rate information in the second radio apparatus 10b contains errors, as described above, in the following cases. First one is a case where a certain period of time elapses after the second radio apparatus 10b has determined the rate information. In other words, the characteristics of a channel between the first radio apparatus 10a and the second radio apparatus 10b generally fluctuates, and the content of rate information also varies according to the fluctuation of channel characteristics. For example, there is a case where although the receiving at 50 Mbps was possible when the rate information was decided, the receiving at 10 MBps is the limit when data are received from the first radio apparatus 10a. The second one is a case where the number of antennas used differs between when the second radio apparatus 10b decides on the rate information and when the data are received from the first radio apparatus 10a. In other words, when the training signals have not yet been fully received from all of the antennas 12 but the second apparatus 10b determines the rate information, there exists an unrecognized channel, so that accurate rate information cannot be derived. For example, when rate information is derived from the first antenna 12a and the second antenna 12b, the effect of the third antenna 12c and fourth antenna 12d is not taken into account, so that error will be contained in the rate information.

Figure 5:
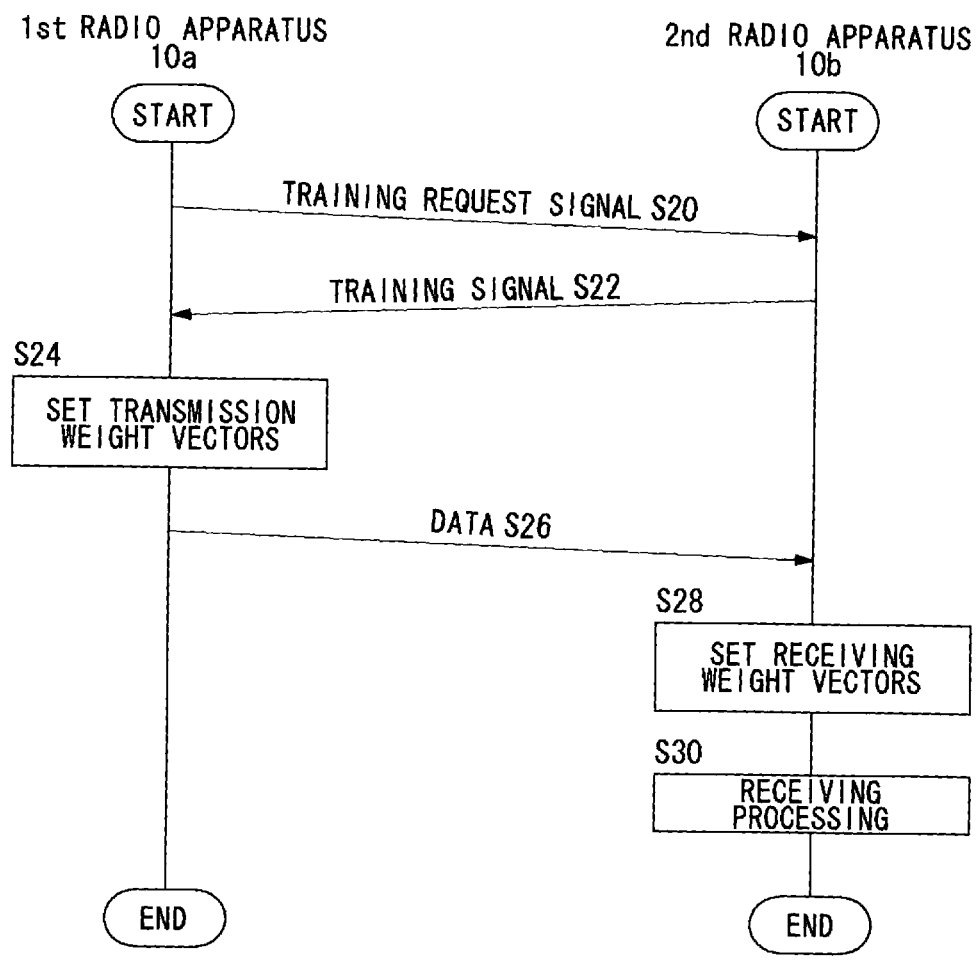
FIG. 5 shows another sequence of communication procedure to be compared in the communication system of FIG. 2.

FIG. 5 shows another sequence of communication procedure to be compared in the communication system 100. Shown here is an operation in which data are transmitted by MIMO. The first radio apparatus 10a sends a training request signal to the second radio apparatus 10b (S20). The training request signal is contained in the "First Data" and/or "Second Data" shown in FIG. 3A. The second radio apparatus 10b sends a training signal to the first radio apparatus 10a (S22). The first radio apparatus 10a derives transmission weight vectors, based on the training signals received and then sets them (S24). The first radio apparatus 10a transmits data using the transmission weight vectors (S26). The second radio apparatus 10b derives receiving weight vectors for the received data and sets them (S28). Then the second radio apparatus 10b performs a receiving processing on the data, based on the receiving weight vectors (S30).

According to the above-described operation, the second radio apparatus 10b transmits the training signals from all of antennas 14, so that the power consumption increases. On the other hand, there is a case where the less number of antennas 14 to be used suffices if the data rate in the rate information is low to some extent. In such a case, the deterioration in transmission quality can be suppressed even if no training signal is sent from the antennas 14 which are not scheduled to be used. In particular, the reduction of power consumption is desired when the second radio apparatus 10b is a terminal apparatus and is battery-driven.

Figure 6:
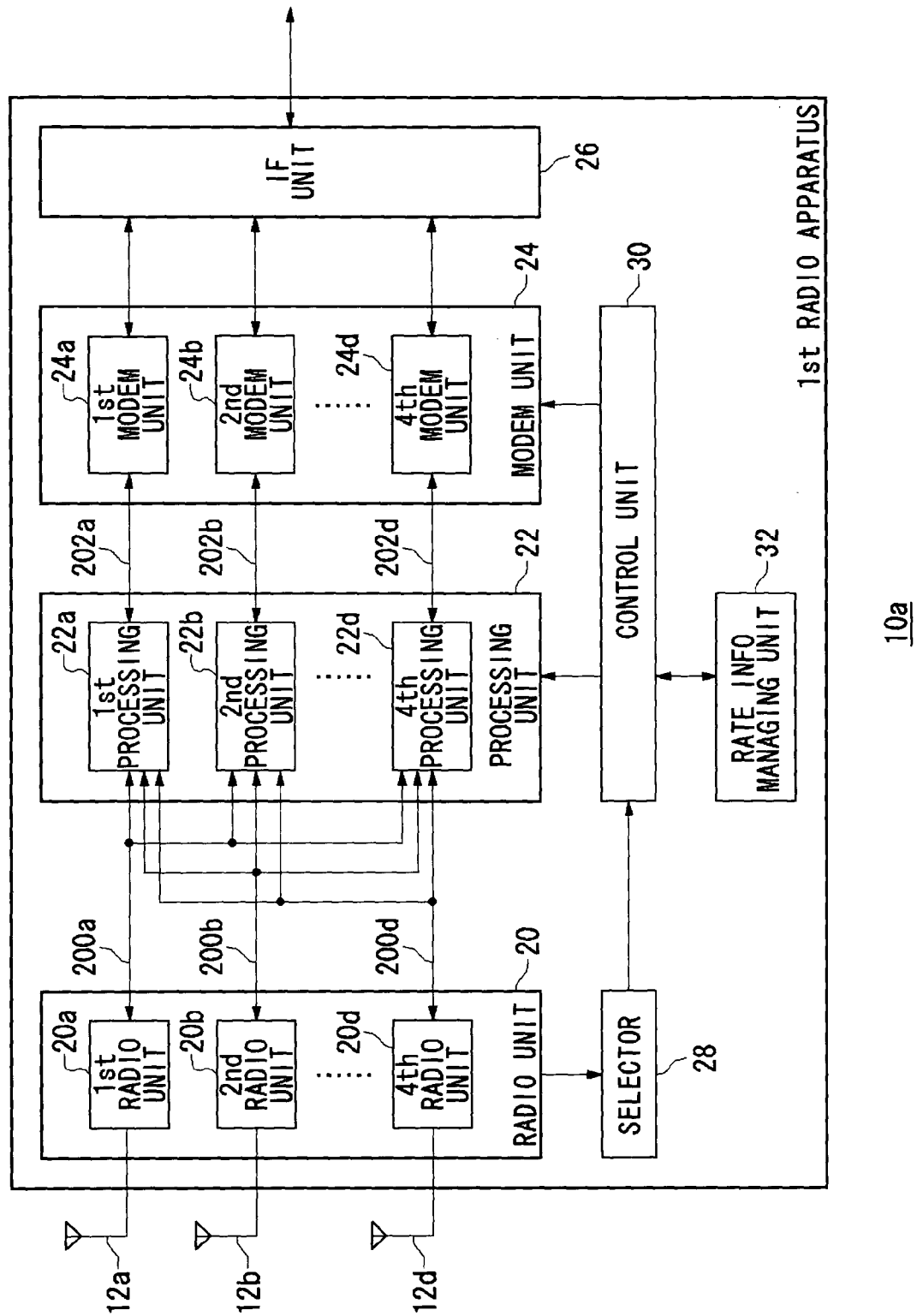
FIG. 6 illustrates a structure of a first radio apparatus of FIG. 2.

FIG. 6 illustrates a structure of a first radio apparatus 10a. The first radio apparatus 10a includes a first radio unit 20a, a second radio unit 20b, ... and a fourth radio unit 20d, which are generically referred to as "radio unit 20", a first processing unit 22a, a second processing unit 22b, ... and a fourth radio 22d, which are generically referred to as "processing unit 22", a first modem unit 24a, a second modem unit 24b, ... and a fourth modem unit 24d, which are generically referred to as "modem unit 24", an IF unit 26, a selector 28, a control unit 30 and a rate information managing unit 32. Signals involved include a first time-domain signal 200a, a second time-domain signal 200b, ... and a fourth time-domain signal 200d, which are generically referred to as "time-domain signal 200", and a first frequency-domain signal 202a, a second frequency-domain signal 202b, ... and a fourth frequency-domain signal 202*d*, which are generically referred to as "frequency-domain signal 202". The second radio apparatus 10*b* has a structure similar to that of the first radio apparatus 10*a*. Different component or components will be further included in this structure depending on whether the first radio apparatus 10*a* (or second radio apparatus 10*b*) is a base station apparatus or terminal apparatus. However, for the clarity of explanation, they will be omitted here. As a receiving operation, the radio unit 20 carries out frequency conversion of received radiofrequency signal received by the antennas 12 so as to derive baseband signals. The radio unit 20 outputs the baseband signals to the processing unit 22 as the time-domain signals 200. The baseband signal, which is composed of in-phase components and quadrature components, shall generally be transmitted by two signal lines. For the clarity of figure, such signal lines is presented here by a single signal line. An AGC unit and/or an A-D conversion unit are also included. As a transmission operation, the radio unit 20 carries out frequency conversion of baseband signals from the processing unit 22 so as to derive radiofrequency signals. Here, the baseband signal from the processing unit 22 is also indicated as the time-domain signal 200. The radio unit 20 outputs the radiofrequency signals to the antenna 12. A power amplifier and/or a D-A conversion unit are also included. It is assumed herein that the time-domain signal 200 is a multi-carrier signal converted to the time domain and is a digital signal. Signals processed in the radio unit 20 form burst signals, and their formats are those as shown in FIGS. 3A and 3B.

As a receiving operation, the processing unit 22 converts a plurality of time-domain signals 200 respectively into the frequency domain and performs adaptive array signal processing on the thus converted frequency-domain signals. Then the processing unit 22 outputs the result of adaptive array signal processing as the frequency-domain signals 202. One frequency-domain signal 202 corresponds to a signal transmitted from one of the antennas 14 shown in FIG. 2, and this corresponds to a signal corresponding to one channel. As a transmission operation, the processing unit 22 inputs, from the modem unit 24, the frequency-domain signal 202 serving as a frequency-domain signal, and then performs adaptive array signal processing on the frequency-domain signal. Then the processing unit 22 coverts the signal that has undergone the adaptive array signal processing, into the time domain and outputs the thus converted signal as a time-domain signal 200. Here, the number of antennas 12 to be used in the transmission processing is specified by the control unit 30. It is assumed herein that the frequency-domain signal 202, which is a signal in the frequency domain, contains a plurality of subcarrier components. For the clarity of figure, the frequency-domain signal is arranged in the order of the subcarrier numbers, and forms serial signals.

Figure 7:
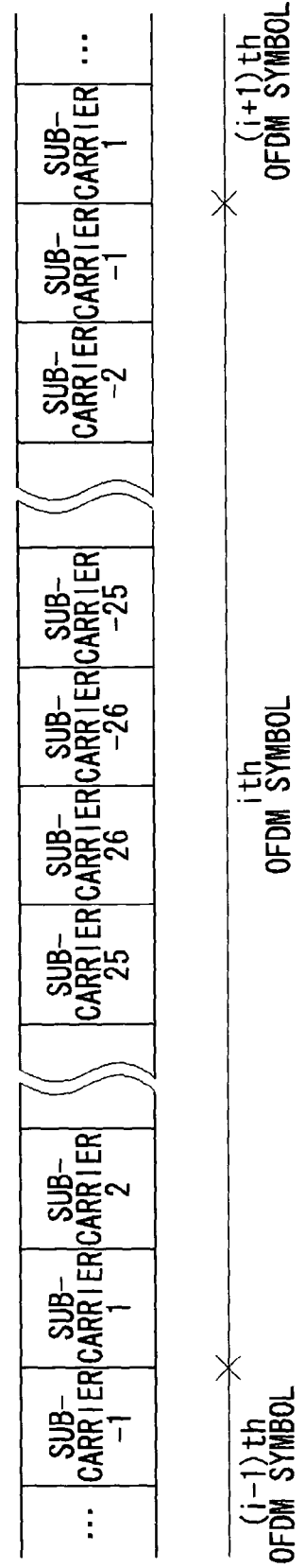
FIG. 7 illustrates a structure of frequency-domain signal shown in FIG. 6.

FIG. 7 illustrates a structure of a frequency-domain signal. Assume herein that a combination of subcarrier numbers "−26" to "26" shown in FIG. 1 constitutes an "OFDM" symbol. An "i"th OFDM symbol is such that subcarrier numbers "1" to "26" and subcarriers "−26" to "−1" are arranged in this order. Assume also that an "i−1"th OFDM symbol is placed immediately before the "i"th OFDM symbol, and an "i+1"th OFDM symbol is placed immediately after the "i"th OFDM symbol.

Referring back to FIG. 6, as a receiving processing, the modem unit 24 demodulates and decodes the frequency-domain signal 202 outputted from the processing unit 22. The demodulation and decoding are carried out per subcarrier. The modem unit 24 outputs the decoded signal to the IF unit 26. As a transmission processing, the modem unit 24 carries out coding and modulation. The modem unit 24 outputs the modulated signal to the processing unit 22 as a frequency-domain signal 202. When the transmission processing is carried out, the modulation scheme and coding rate are specified by the control unit 30. They are specified based on the above-described rate information.

As a receiving processing, the IF unit 26 combines signals outputted from a plurality of modem units 24 and then forms one data stream. The IF unit 26 outputs the data stream. As a transmission processing, the IF unit 26 inputs one data stream and then separates it. Then the IF unit 26 outputs the thus separated data to a plurality of modem units 24.

A description is given hereinbelow of a case when a request signal is transmitted in such a structure as above. As shown in FIG. 3A or 3B, the processing unit 22 transmits, from at least one of a plurality of antennas 12, data corresponding respectively to the plurality of antennas 12.

If the number of antennas 12 to be used is "2", the data correspond to "First Data" and "Second Data" in FIG. 3A or 3B. Assume herein that the number of antennas 12 to be used for data transmission is specified by the control unit 30. The processing unit 22 also adds signals other than Data, such as "Legacy STS", as shown in FIG. 3A. When the number of antennas 12 to be used for data transmission becomes "4", "Third Data" and "Fourth Data" which are not shown in FIGS. 3A and 3B will be added. Such data are transmitted to the second radio apparatus 10*b* compatible with variable data rates.

The control unit 30 generates request signals with which to let the second radio apparatus 10*b* supply information on rates at the second radio apparatus 10*b*. Then the control unit 30 outputs the thus generated request signal to the modulation unit 24. When transmitting the request signal, the processing unit 22 also transmits, from a plurality of antennas 12 which includes antennas 12 other than the antennas 12 used to transmit the data, known signals corresponding respectively to the plurality of antennas 12. Here, the request signal is allotted to "First Data" and/or "Second Data" of FIG. 3B. In FIG. 3B, the known signals correspond to "First MIMO-STS", "First MIMO-LTS" to "Fourth MIMO-STS" and "Fourth MIMO-LTS". As a result, even if the number of antennas 12 to transmit is "2" as in the case of FIG. 3B, the processing unit 22 transmits the known signals, namely, training signals, from "four" antennas 12. In this manner, the request signals and the training signals are combined together and transmitted; and then the first radio apparatus 10*a* has the second radio apparatus 10*b* generate the rate information based on the training signals, and can obtain the thus generated rate information. As a result, the accuracy of rate information, acquired by the first radio apparatus 10*a*, on the second radio apparatus 10*b* improves.

In response to the above description, a description will now be given of a case where the request signal and the training signals are received. The control unit 30 generates the rate information, based on the received training signal. A method for generating the rate information may be arbitrary. For example, the rate information may be generated in a manner such that the signal strength of signals received by the radio unit 20 is measured and the measured signal strength is compared with a threshold value. Alternatively, the rate information may also be generated based on the receiving weight vectors derived by the processing unit 22. More detailed description of a specific example to generate the rate information will be given later. The rate information may be generated based on a demodulation result obtained by the modem unit 24. The rate information thus determined is transmitted via the modem unit 24, processing unit 22 and radio unit 20 and is at the same time stored in the rate information managing unit 32. The rate information managing unit 32 also stores the rate information at a targeted radio apparatus 10.

With the structure described as above, the first radio apparatus 10a operates as follows to reduce the power consumption. The radio unit 20 receives, via a plurality of antennas 12, training signals from the second radio apparatus 10b. Based on the received training signals, the selector 28 selects, from among a plurality of antennas 12, at least one antenna 12 to be used when data are received from the second radio apparatus 10b. More specifically, such an operation is as follows. Based on the training signals received by the radio unit 20, the selector 28 derives signal strength corresponding respectively to the plurality of antennas 12. The selector 28 preferentially selects antennas 12 whose strength is larger. If, for example, the number of antennas 12 to be used when the data are received is "3", the selector 28 selects "three" antennas from among those whose signal strengths are large. It is to be noted here that the total number of antennas 12 to be selected is specified separately based on a value of data rate, at which the data are to be transmitted, and/or a value of power consumption. While using the antennas 12 selected by the selector 28, the processing unit 22 transmits the training signals. In this manner, the power consumption is lowered by reducing the number of the antennas 12 that should actually transmit the training signal.

It is also possible to execute the above-described operation even in a case when the request signal is not transmitted. In other words, the above-described operation can be applied even in a case when a training request signal is accepted from the second radio apparatus 10b. That is, the selector 28 selects, from among a plurality of antennas 12, at least one antenna 12 to be used when the data from the second radio apparatus 10b are received. In so doing, the selection is done based on an instruction from the control unit 30. The processing unit 22 transmits data corresponding respectively to the antennas 12, from at least one of a plurality of antennas 12 to the second radio apparatus 10b, and also transmits training signals corresponding respectively to the antennas 12 selected by the selector 28, independently of the number of antennas 12 to be used when the data are transmitted. For example, the data are transmitted from "two" antennas 12 and the training signals are transmitted from "three" antennas 12.

In terms of hardware, this structure can be realized by a CPU, memory and other LSIs of an arbitrary computer. In terms of software, it is realized by memory-loaded programs which have communication functions or the like, but drawn and described herein are function blocks that are realized in cooperation with those. Thus, it is understood by those skilled in the art that these function blocks can be realized in a variety of forms such as by hardware only, software only or the combination thereof.

Figure 8:
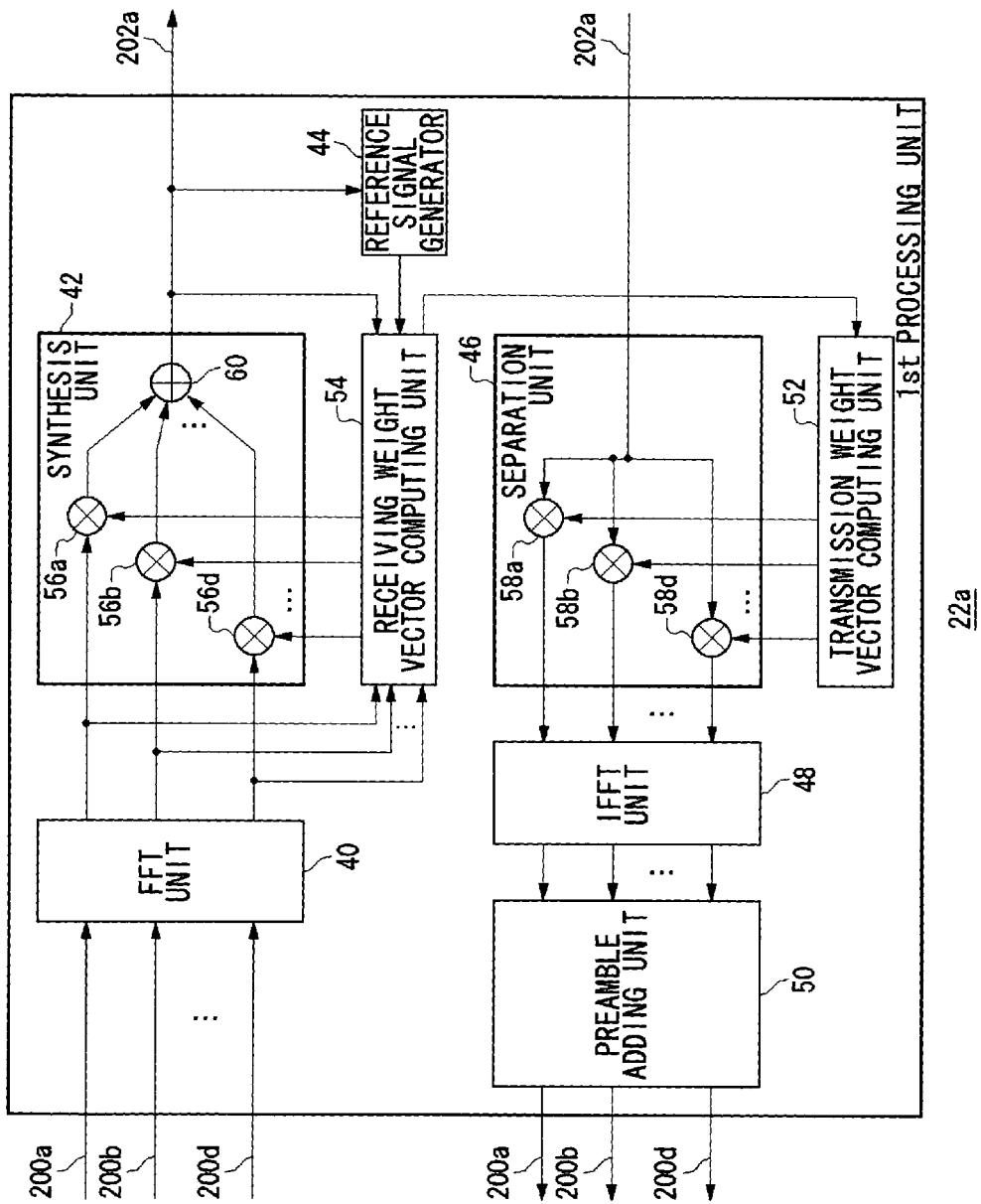
FIG. 8 illustrates a structure of a first processing unit shown in FIG. 6.

FIG. 8 illustrates a structure of a first processing unit 22a. The first processing unit 22a includes an FFT (Fast Fourier Transform) unit 40, a synthesis unit 42, a reference signal generator 44, a receiving weight vector computing unit 54, a separation unit 46, a transmission weight vector computing unit 52, an IFFT unit 48 and a preamble adding unit 50. The synthesis unit 42 includes a first multiplier 56a, a second multiplier 56b, ... and a fourth multiplier 56d, which are generically referred to as "multiplier 56", and an adder 60. The separation unit 46 includes a first multiplier 58a, a second multiplier 58b, ... and a fourth multiplier 58d, which are generically referred to as "multiplier 58".

The FFT unit 40 inputs a plurality of time-domain signals 200 and performs Fast Fourier Transform on them, respectively, so as to derive frequency-domain signals. As described earlier, one frequency-domain signal is such that signals corresponding to subcarriers are arranged serially in the order of the subcarrier numbers.

The multiplier 56 weights the frequency-domain signal with a receiving weight vector outputted from the receiving weight vector computing unit 54, and the adder 60 adds up the outputs from the multipliers 56. Since the frequency-domain signals are arranged in the order of the subcarrier numbers, the receiving weight vectors outputted from the receiving weight vector computing unit 54 are arranged in such a manner as to correspond thereto, too. That is, one multiplier 56 inputs successively the receiving weight vectors arranged in the order of the subcarrier numbers. Accordingly, the adder 60 adds up a multiplication result on a subcarrier-by-subcarrier basis. As a result, the added-up signal is also arranged serially in the order of the subcarrier numbers, as shown in FIG. 7. The thus added-up signal is the aforementioned frequency-domain signal 202.

In the following explanation, if the signal to be processed corresponds to the frequency-domain, the processing therefor is basically executed subcarrier by subcarrier, too. For the brevity of explanation, the processing for one subcarrier will be described herein. Hence, the processing for a plurality of subcarriers will be accommodated in a manner such that the processing for a single subcarrier is executed in parallel or serially.

During the period of "Legacy STS", "Legacy LTS", "First MIMO-STS" and "First MIMO-LTS", the reference signal generator 44 outputs, as reference signals, "Legacy STS", "Legacy LTS", "First MIMO-STS" and "First MIMO-LTS" which have been stored beforehand. During the period other than these periods, the frequency-domain signal 202 is determined by a predefined threshold value, and its result is outputted as a reference signal. The determination may be a soft decision instead of the hard decision.

The receiving weight vector computing unit 54 derives receiving weight vectors, based on the frequency-domain signal 202 outputted from the FFT unit 40 and the reference signal. A method for deriving the receiving weight vectors may be arbitrary. One such a method is the derivation by an LMS (Least Mean Square) algorithm. The receiving weight vectors may be derived by a correlation processing. When a correlation processing is carried out, the frequency-domain signal and the reference signal will be inputted not only from the first processing unit 22a but also from the second processing unit 22b and so forth via a signal line not shown. If a frequency-domain signal in the first processing unit 22a is denoted by $x_1(t)$, a frequency-domain signal in the second processing unit 22b by $x_2(t)$, a reference signal in the first processing unit 22a by $S_1(t)$ and a reference signal in the second processing 22b by $S_2(t)$, then $x_1(t)$ and $X_2(t)$ will be expressed by the following Equation (1):

$$x_1(t)=h_{11}S_1(t)+h_{21}S_2(t)$$

$$x_2(t)=h_{12}S_1(t)+h_{22}S_2(t) \tag{1}$$

The noise is ignored here. A first correlation matrix $R_1$, with E as an ensemble average, is expressed by the following Equation (2):

$$R_1 = \begin{bmatrix} E[x_1 S_1^*] & E[x_1 S_1^*] \\ E[x_2 S_2^*] & E[x_2 S_2^*] \end{bmatrix} \tag{2}$$

A second correlation matrix $R_2$ among the reference signals is given by the following Equation (3):

$$R_2 = \begin{bmatrix} E[S_1 S_1^*] & E[S_1 S_2^*] \\ E[S_2 S_1^*] & E[S_2 S_2^*] \end{bmatrix} \quad (3)$$

Finally, the first correlation matrix $R_1$ is multiplied by the inverse matrix of the second correlation matrix $R_2$ so as to derive a receiving response vector, which is expressed by the following Equation (4):

$$\begin{bmatrix} h_{11} & h_{21} \\ h_{12} & h_{22} \end{bmatrix} = R_1 R_2^{-1} \quad (4)$$

Then the receiving weight vector computing unit 54 computes a receiving weight vector from the receiving response vector.

The transmission weight vector computing unit 52 estimates the transmission weight vectors necessary for weighting the frequency-domain signals 202, from the receiving weight vectors. The method for estimating the transmission weight vectors is arbitrary. As a most simple method therefor, however, the receiving weight vector may be used directly as it is. As another method, the receiving weight vector may be corrected using a conventional technique in view of the Doppler frequency shift of a propagation environment caused by time difference in between a receiving processing and a transmission processing. Here, it is assumed here that the receiving weight vectors are used directly as the transmission weight vectors.

The multipliers 58 weight the frequency-domain signals 202 with the transmission weight vectors, and the results thereof are outputted to the IFFT unit 48. Then the IFFT unit 48 performs inverse Fast Fourier Transform on the signals outputted from the multipliers 58 so as to convert them into time-domain signals. As shown in FIGS. 3A and 3B, the preamble adding unit 50 appends preambles in a header portion of burst signal. Here, "Legacy STS", "Legacy LTS", "First MIMO-STS" and "First MIMO-LTS" are appended. The preamble adding unit 50 outputs, as time-domain signals 200, the signals where the preamble has been added. The above-described operation is controlled by the control unit 30 shown in FIG. 6. In FIG. 8, the first time-domain signal 200a and the like appear twice. However, these are the signal in one direction and these correspond to the first time-domain signal 200a and the like which are two-way signals as shown in FIG. 6.

Figure 9:
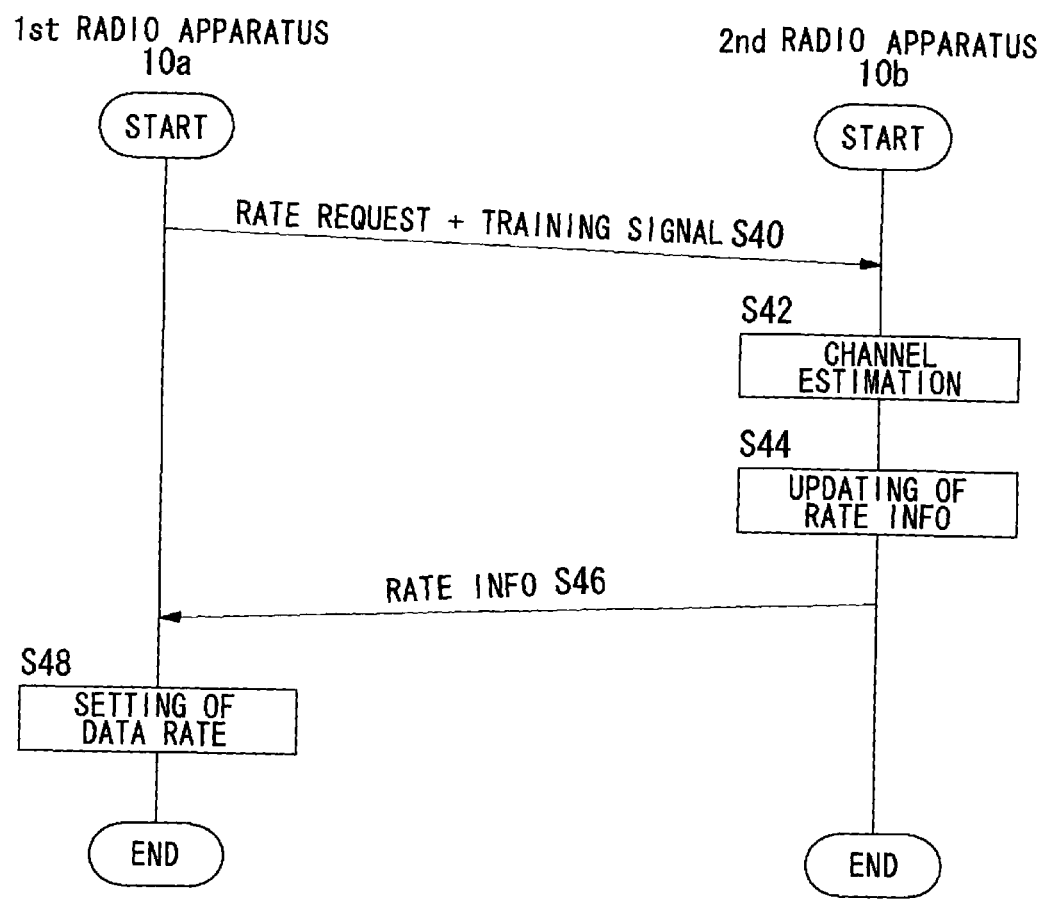
FIG. 9 is a sequence diagram showing a procedure of setting a data rate in the communication system of FIG. 2.

An operation of a communication system 100 structured as above will now be described. FIG. 9 is a sequence diagram showing a procedure of setting a data rate in the communication system 100. FIG. 9 is a sequence diagram that shows a case when a rate request signal and training signals are transmitted, and FIG. 9 corresponds to FIG. 4. The first radio apparatus 10a transmits to the second radio apparatus 10b a rate request signal and training signals as shown in FIG. 3B (S40). The second radio apparatus 10b estimates a channel based on the training signals (S42). Here, the channel estimation corresponds to deriving the aforementioned receiving weight vectors. The second radio apparatus 10b updates the rate information, based on the estimated channel (S44). The description on the updating of the rate information is omitted here. The second radio apparatus 10b transmits the rate information to the first radio apparatus 10a (S46). The first radio apparatus 10a sets a data rate by referring to the thus received rate information (S48).

Figure 10:
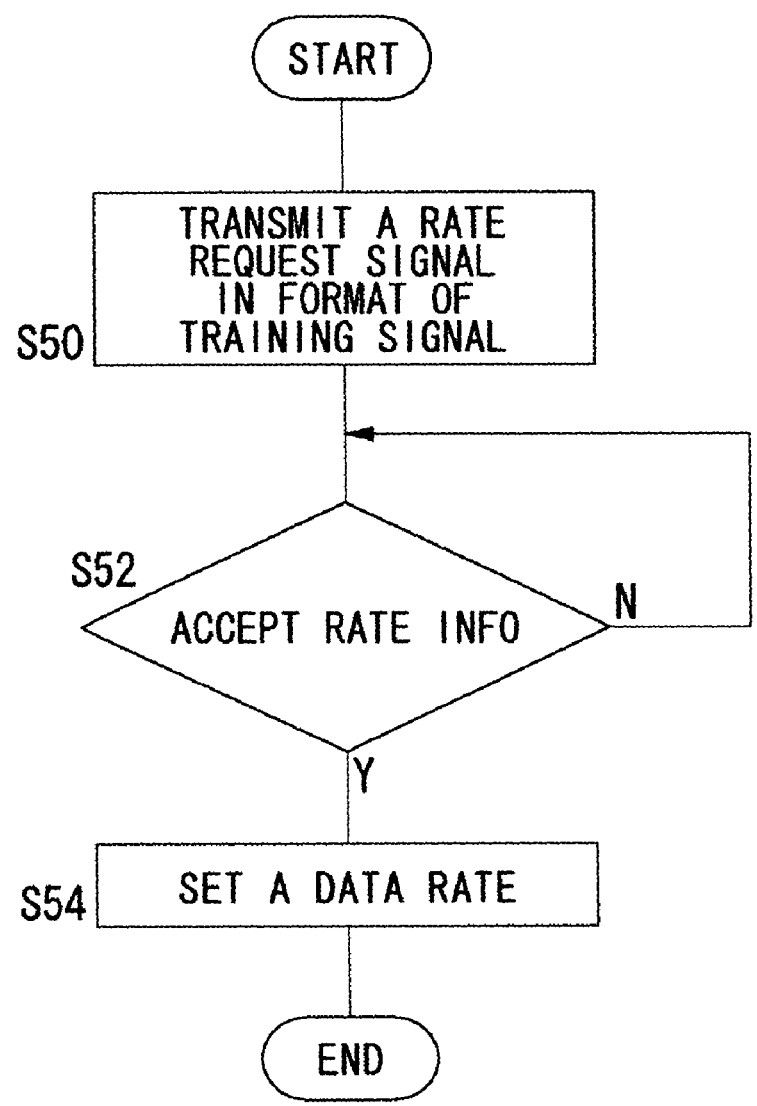
FIG. 10 is a flowchart showing a procedure of setting a data rate in the first radio apparatus of FIG. 6.

FIG. 10 is a flowchart showing a procedure of setting a data rate in the first radio apparatus 10a. FIG. 10 corresponds to the operation of first radio apparatus 10a in FIG. 9. The processing unit 22 transmits a rate request signal in a format of training signals as shown in FIG. 3B (S50). If the IF unit 26 does not accept rate information via the antenna 12, radio unit 20, processing unit 22 and modem unit 24 (N of S52), keep waiting until the IF unit 26 accepts it. If, on the other hand, the IF unit 26 accepts the rate information (Y of S52), the control unit 30 sets a data rate (S54). The rate information managing unit 32 stores the rate information.

Figure 11:
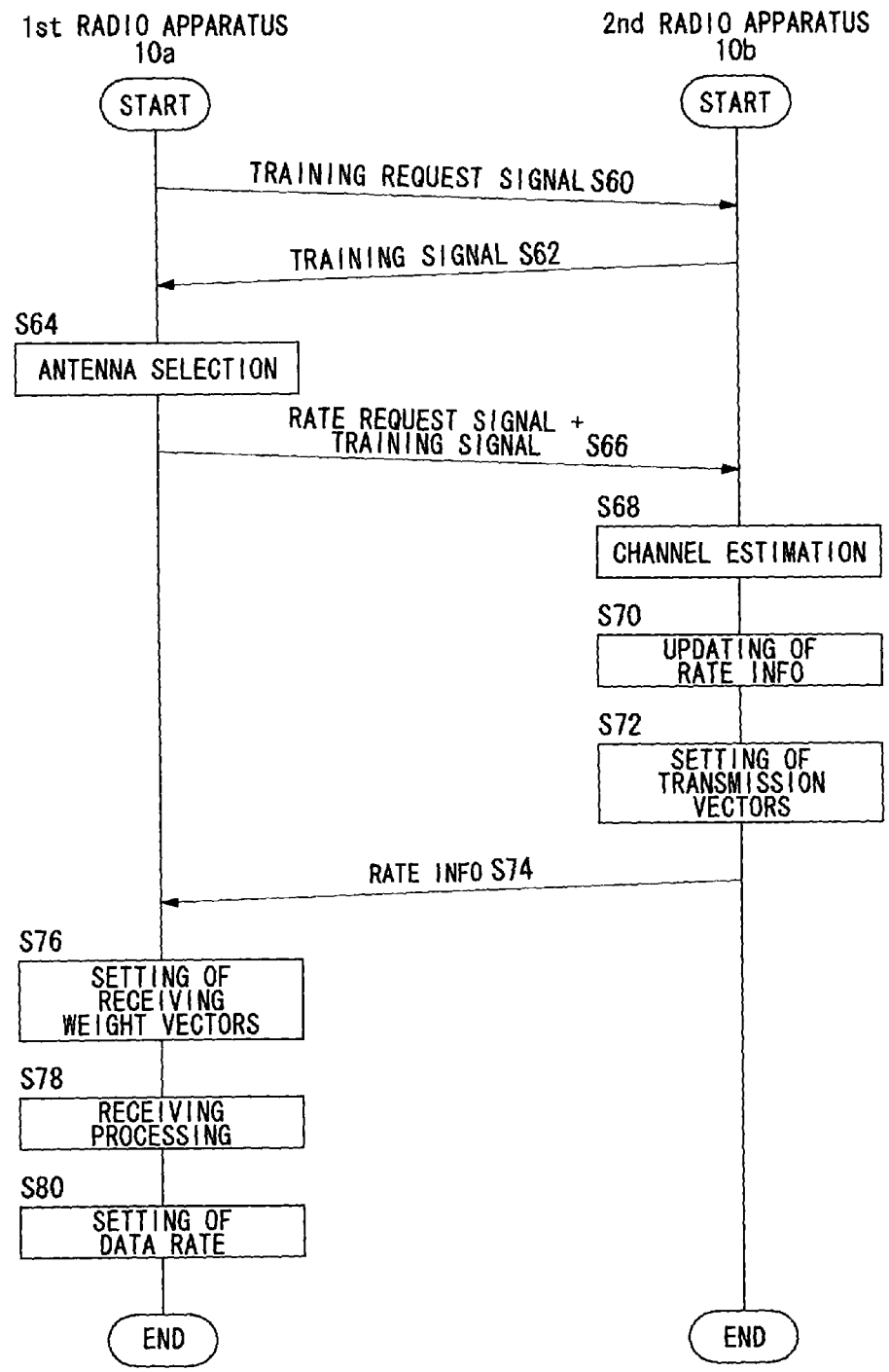
FIG. 11 is a sequence diagram showing another procedure of setting a data rate in the communication system of FIG. 2.

FIG. 11 is a sequence diagram showing another procedure of setting a data rate in the communication system 100. FIG. 11, which corresponds to FIG. 5, is a sequence diagram for a processing wherein adaptive array signal processing is taken into account and a lower power consumption is intended on top of FIG. 9. The first radio apparatus 10a transmits a training request signal to the second radio apparatus 10b (S60). The second radio apparatus 10b transmits training signals to the first radio apparatus 10a (S62). The first radio apparatus 10a selects antennas 12 based on the strength of the received training signals (S64). The first radio apparatus 10a transmits to the second radio apparatus 10b a rate request signal and training signals as shown in FIG. 3B. The training signals are transmitted from the selected antennas 12.

The second radio apparatus 10b estimates a channel, based on the training signals (S68). Based on the estimated channel, the second radio apparatus 10b updates the rate information (S70). The second radio apparatus 10b derives transmission weight vectors and then sets them (S72). The second radio apparatus 10b transmits the rate information to the first radio apparatus 10a (S74). In so doing, the transmission weight vectors are used so as to execute adaptive array signal processing. The first radio apparatus unit 10a sets receiving weight vectors, based on a burst signal that contains the rate information (S76). While using the receiving weight vectors, the first radio apparatus 10a performs a receiving processing on the rate information (S78). The first radio apparatus 10a sets a data rate by referring to the accepted rate information (S80).

Figure 12:
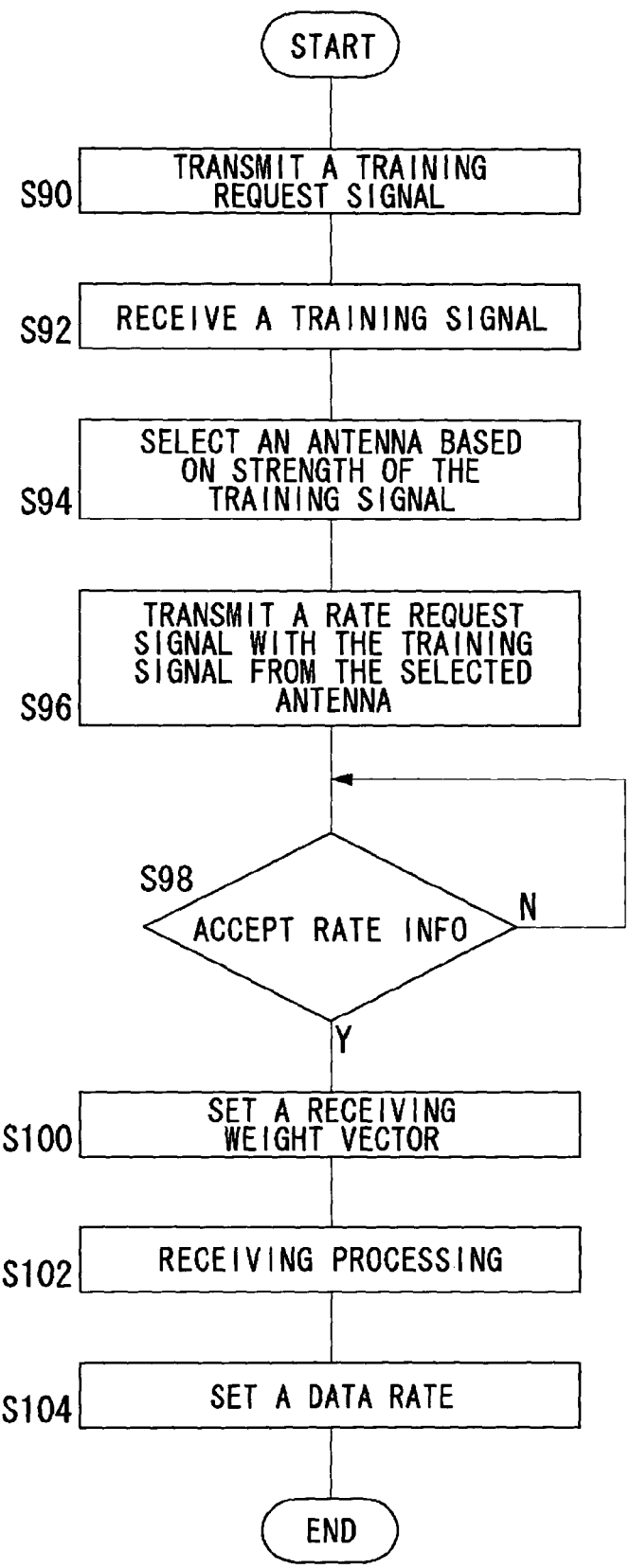
FIG. 12 is another flowchart showing a procedure of setting a data rate in a first radio apparatus of FIG. 6.

FIG. 12 is a flowchart showing another procedure of setting a data rate in the first radio apparatus 10a. FIG. 12 corresponds to the operation of first radio apparatus 10a shown in FIG. 11. The processing unit 22 transmits a training request signal (S90). The radio unit 20 receives training signals (S92). The selector 28 measures the strength of the received training signals for each antenna 12, and selects an antenna 12 based on the measured strength (S94). The processing unit 22 transmits, from the selected antenna 12, the training signals in a format of training signals as shown in FIG. 3B and also transmits a rate request signal (S96).

If the IF unit 26 does not accept the rate information via the antenna 12, radio unit 20, processing unit 22 and modem unit 24 (N of S98), keep waiting until the IF unit 26 accepts it. If, on the other hand, the IF unit 26 accepts the rate information (Y of S98), the processing unit 22 sets receiving weight vectors (S100). The processing unit 22, modem unit 24 and IF unit 26 carry out receiving processing (S102). The control unit 30 sets a data rate (S104). The rate information managing unit 32 stores the rate information.

Figure 13:
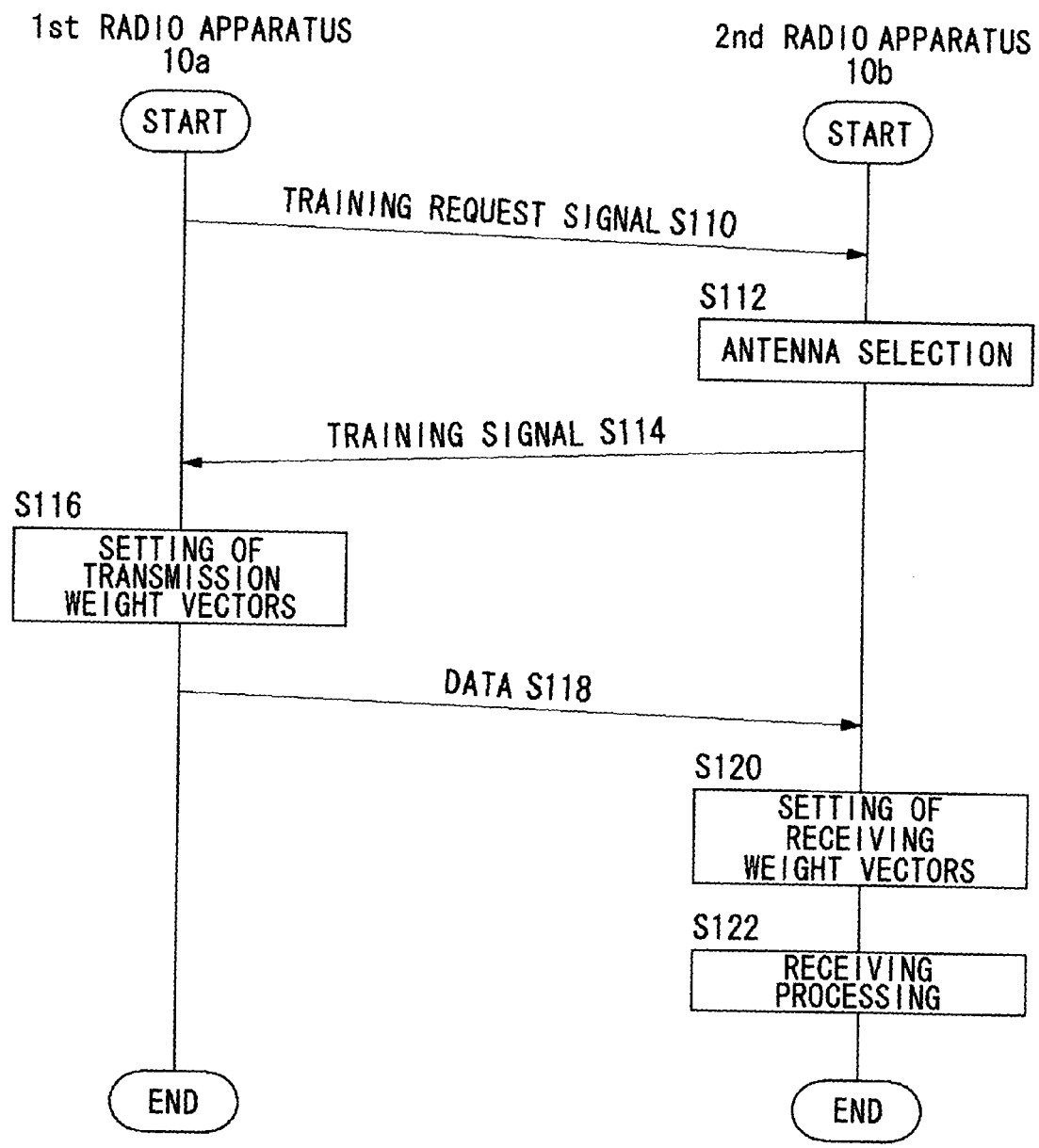
FIG. 13 is a sequence diagram showing a communication procedure in the communication system of FIG. 2.

FIG. 13 is a sequence diagram showing a communication procedure in the communication system 100. FIG. 13 is a sequence diagram for a procedure wherein the lower power consumption is intended in transmitting the training signals.

The first radio apparatus 10a transmits a training request signal to the second radio apparatus 10b (S110). The second radio apparatus 10b selects an antenna 14 which is to be used when data are received (S112). The second radio apparatus 10b transmits training signals to the first radio apparatus from the selected antenna 14 (S114). The first radio apparatus 10a sets transmission weight vectors, based on the strength of the received training signals (S116). While using the transmission weight vectors, the first radio apparatus 10a transmits data to the second radio apparatus 10b (S118). The second radio apparatus 10b derives a receiving weight vector from a burst signal that contains the data, and then sets this vector (S120). The second radio apparatus 10b carries out a receiving processing, based on the receiving weight vectors (S122)

Figure 14:
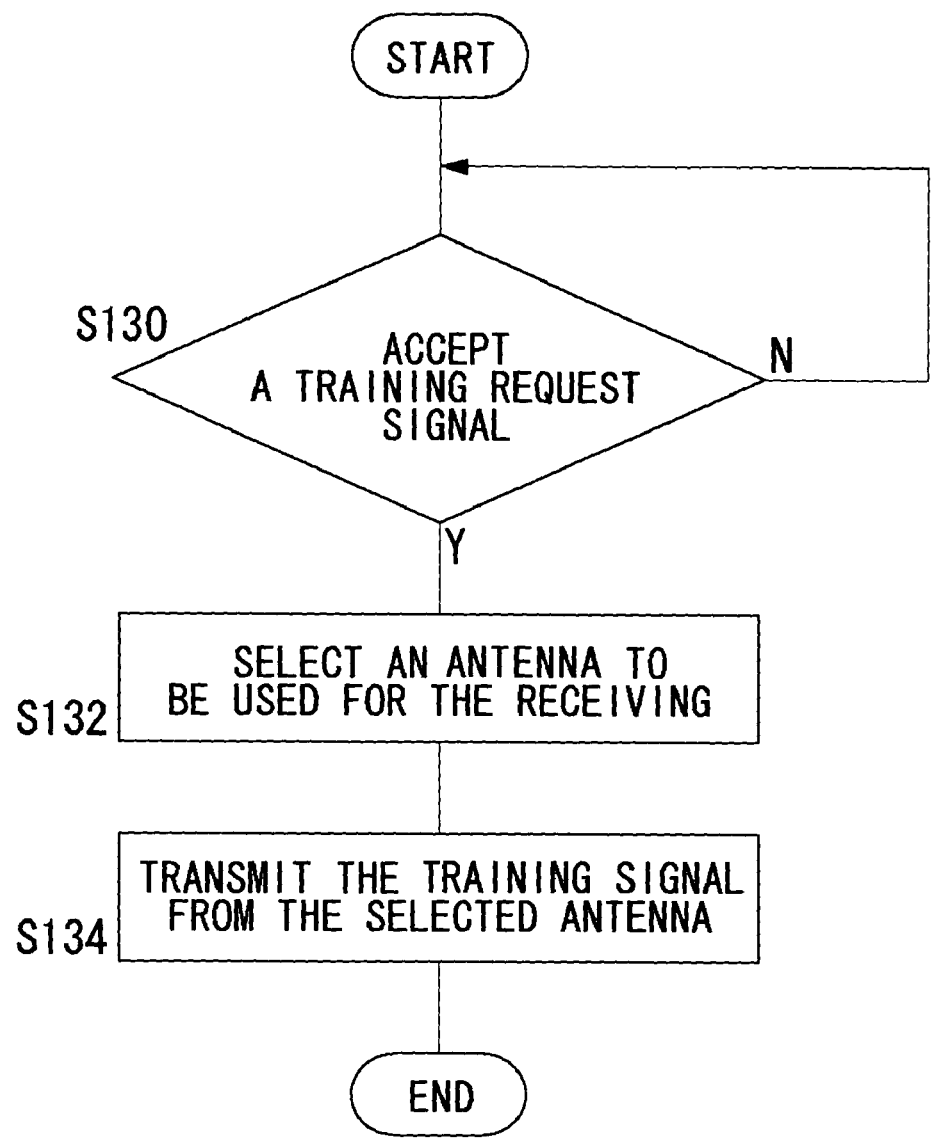
FIG. 14 is a flowchart showing a transmission procedure in a second radio apparatus of FIG. 13.

FIG. 14 is a flowchart showing a transmission procedure in the second radio apparatus 10b. FIG. 14 corresponds to the operation of the second radio apparatus 10b of FIG. 13. The processing is not started if the IF unit 26 does not accept a training request signal via the antenna 12, radio unit 20, processing unit 22 and modem unit 24 (N of S130). If, on the other hand, the IF unit 26 accepts the training request signal (Y of S130), the control unit 30 selects an antenna 14 which is to be used at the time of receiving (S132). The processing unit 22 transmits training signals from the selected antennas 14 (S134).

In the present embodiments described so far, the first radio apparatus 10a does not carry out adaptive array signal processing, namely, beam forming at the time of sending the training signals. This is for the purpose of having the second radio apparatus 10b perform the channel estimation in a state where the directivity of antenna is omnidirectional. In other words, this is for the purpose of having the second radio apparatus 10b perform the channel estimation in a state close to the original state of the channel. As described earlier, when the training signals and the rate request signal are combined together, the first radio apparatus 10a can process, at high speed, the rate information determined in the second radio apparatus 10b by performing the following processing. If the first radio apparatus 10a performs beamforming, SNR (Signal-to-Noise Ratio) in the second radio apparatus 10b at the time of receiving will be improved compared to the case when it does not perform beamforming. If the second radio apparatus 10b determines the data rate based on the SNR, the improved SNR makes the determined data rate higher. Thus, when sending the rate request signal, the first radio apparatus 10a here performs beamforming at least on the training signals.

Figure 15:
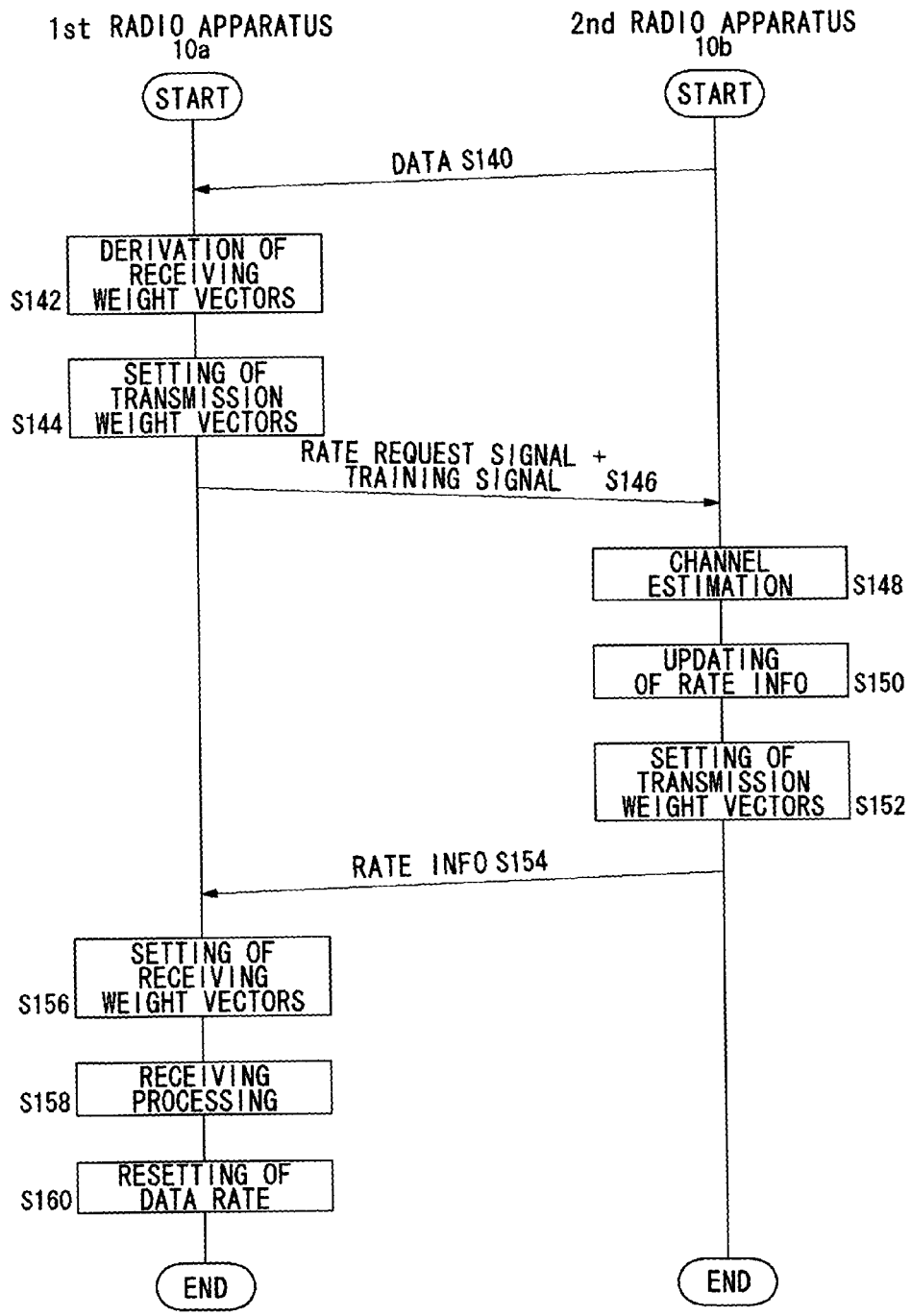
FIG. 15 is a sequence diagram showing still another procedure of setting a data rate in the communication system of FIG. 2.

FIG. 15 is a sequence diagram showing still another procedure of setting a data rate in the communication system 100. The second radio apparatus 10b transmits data to the first radio apparatus 10a (S140). Assume here that communication has already been taking place between the first radio apparatus 10a and the second radio apparatus 10b and the data rate has been set to a predetermined value. The first radio apparatus 10a derives receiving weight vectors, based on the received data (S142). The first radio apparatus 10a derives transmission weight vectors, based on the estimated receiving weight vectors and then sets these (S144). The first radio apparatus 10a performs a receiving processing on the received data. While carrying out beamforming by the derived transmission weight vectors, the first radio apparatus 10a transmits to the second radio apparatus 10b transmits the rate request signal and training signals, as illustrated in FIG. 3B (S146).

Based on the training signals, the second radio apparatus 10b carries out channel estimation (S148). Based on the estimated channel, the second radio apparatus 10b updates rate information (SLSO). The second radio apparatus 10b derives transmission weight vectors and sets these (S152). The second radio apparatus 10b transmits the rate information to the first radio apparatus 10a (S154). In so doing, adaptive array signal processing is carried out by using the transmission weight vectors. The first radio apparatus 10a sets receiving weight vectors, based on a burst signal that contains the rate information (S156). Then, while using the receiving weight vectors, the rate information undergoes a receiving processing (S158). The first radio apparatus 10a resets the data rate by referring to the accepted rate information (S160)

Figure 16:
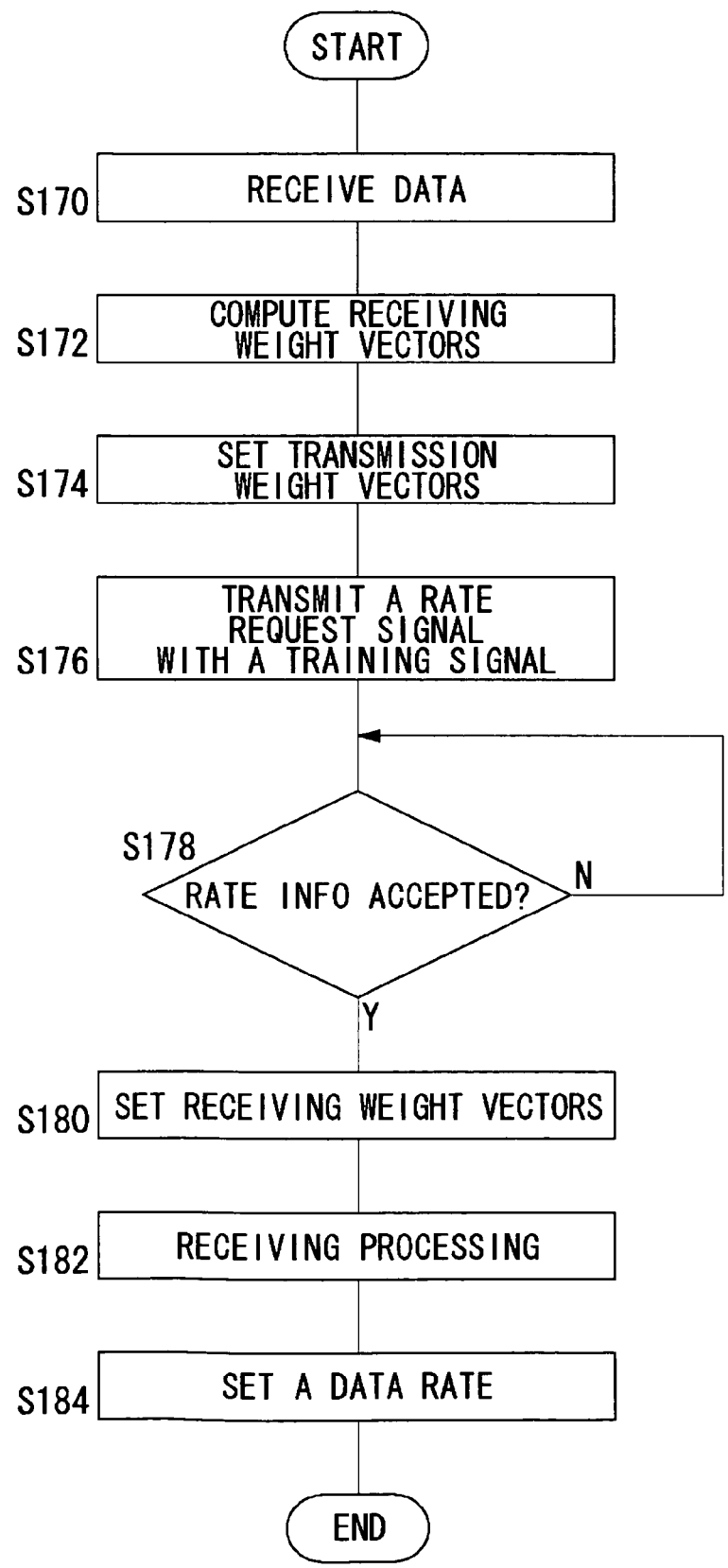
FIG. 16 is a flowchart showing still another procedure of setting a data rate in the first radio apparatus of FIG. 6.

FIG. 16 is a flowchart showing still another procedure of setting a data rate in the first radio apparatus 10a. FIG. 16 corresponds to the operation of first radio apparatus 10a shown in FIG. 15. The radio unit 20 receives data (S170). The processing unit 22 computes receiving weight vectors (S172) and sets transmission weight vectors (S174). While it carries out beamforming by using the transmission weight vectors in a format of training signals as shown in FIG. 3B, the processing unit 22 transmits the training signals from antennas 12 and, at the same time, transmits a rate request signal (S176).

If the IF unit 26 does not accept rate information via the antenna 12, radio unit 20, processing unit 22 and modem unit 24 (N of S178), keep waiting until the IF unit 26 accepts it. If, on the other hand, the IF unit 26 accepts the rate information (Y of S178), the processing unit 22 sets the receiving weight vectors (S180). The processing unit 22, modem unit 24 and IF unit 26 each carries out receiving processing (S182). The control unit 30 sets a data rate (S184). The rate information managing unit 32 stores the rate information.

Figure 17:
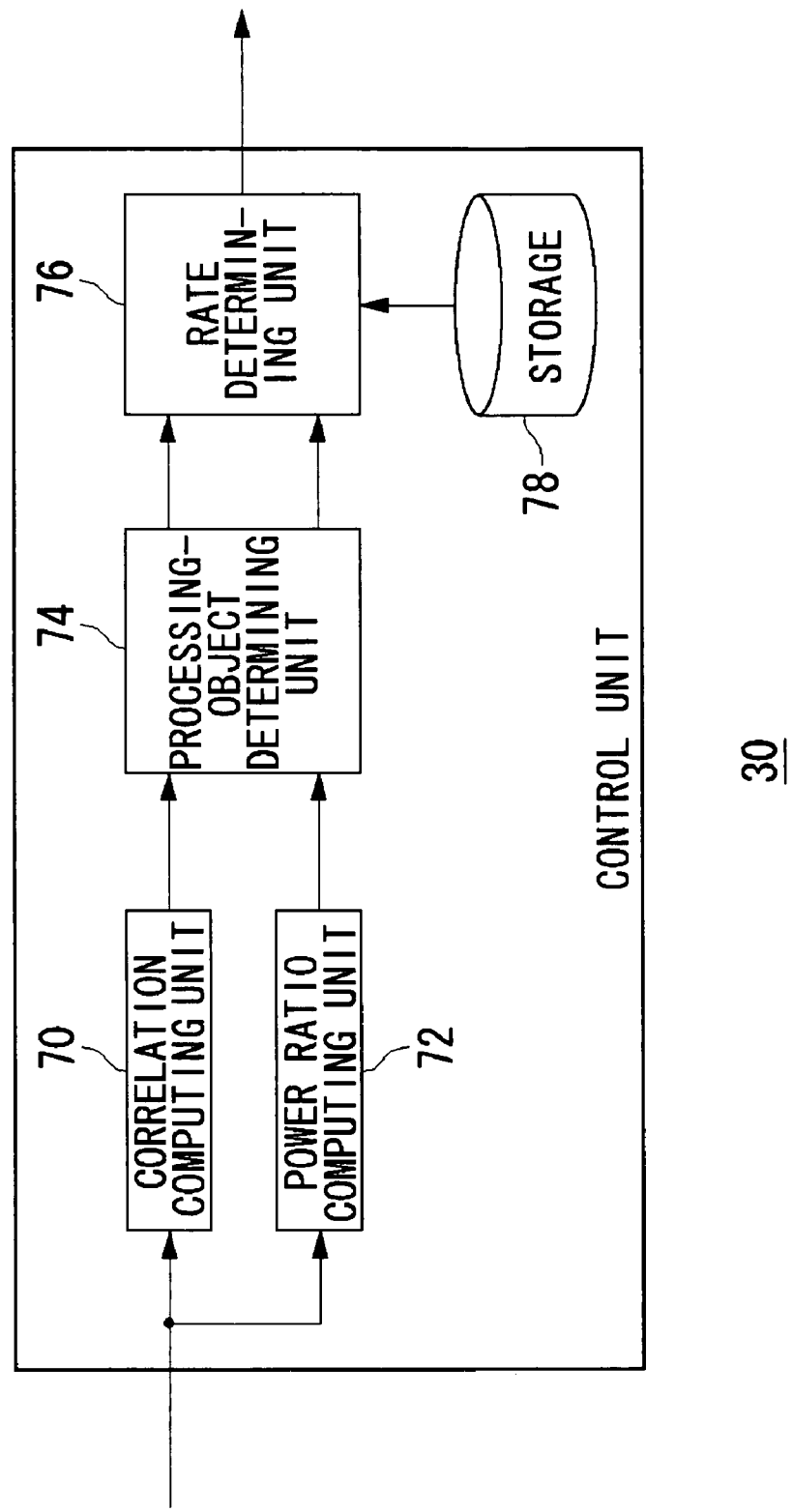
FIG. 17 illustrates a structure of a control unit shown in FIG. 6.

Next, a description will be given of the generation of rate information. The generation of rate information is done in Step 44 of FIG. 9, and it is done by the second radio apparatus 10b. When the direction in which the rate request signal is transmitted is from the second radio apparatus 10b to the first radio apparatus 10a, the rate information is also generated by the first radio apparatus 10a. However, the generation of rate information will be described herein as the processing to be carried out by the second radio apparatus 10b. In this case, the structure shown in FIG. 6 is replaced by that with the antenna 14 instead of the antenna 12. FIG. 17 illustrates a structure of a control unit 30. The control unit 30 includes a correlation computing unit 70, a power ratio computing unit 72, a processing-object determining unit 74, a rate determining unit 76 and a storage 78.

The processing performed by the control unit 30 is based on the assumption, as described earlier, that the radio unit 20, processing unit 22 and modem unit 24 shown in FIG. 6 all receive trainings signal via the antenna 14. As shown FIG. 3B, the training signals are transmitted from a plurality of antennas 12 that include antennas other than the first antenna 12a and second antenna 12b for transmitting the first data and second data. The training signal corresponds to "MIMO-LTS". The respective training signals are so defined as to correspond respectively to a plurality of antennas 12. Based on the received training signals, the receiving weight vector computing unit 54 computes receiving weight vectors corresponding respectively to a plurality of antennas 12. A method for computing the receiving response vectors is implemented as described above and the repeated description thereof is omitted here. The OFDM modulation scheme is applied to the training signals received, as described above, and a plurality of subcarriers are used. Hence, the receiving response vectors are calculated for a plurality of subcarriers, respectively.

The correlation computing unit 70 computes, from the receiving response vectors, correlations among the receiving response vectors corresponding respectively to a plurality of antennas 12. Although the channel characteristics, namely, the receiving response vectors, corresponding to the first antenna 12a are denoted as "$h_{11}$,", "$h_{12}$", "$h_{13}$" and "$h_{14}$" in FIG. 1, these are brought together and generically called "$h_1$" here and it is assumed here that the number of antennas 12 is "2". If assumed accordingly, then the correlation computing unit 70 computes a correlation value S which is expressed by the following Equation (5).

$$S = \frac{h_1^H h_2}{\sqrt{h_1^H h_1} \sqrt{h_2^H h_2}} \quad (5)$$

The thus computed correlation value S is the value corresponding to one subcarrier, and the correlation computing unit 70 derives correlation values S, respectively, that correspond to a plurality of subcarriers. It is to be noted here that the numerator in Equation (5) may serve as the correlation value S.

The power ratio computing unit 72 computes, from the receiving response vectors, power ratios among the receiving response vectors corresponding respectively to a plurality of antennas. The power ratio computing unit 72 computes a power ratio R which is expressed by the following Equation (6).

$$R = \frac{h_1^H h_1}{h_2^H h_2} \quad (6)$$

The thus computed power ratio R is the value corresponding to one subcarrier, and the power ratio computing unit 72 derives power ratios, respectively, that correspond to a plurality of subcarriers.

The processing-object determining unit 74 inputs a plurality of correlation values S and power ratios R corresponding respectively to a plurality of subcarriers. The processing-object determining unit 74 determines an object to be used to determine a data rate, from a plurality of correlation values S and a plurality of power ratios. One of methods for determining the object is to select a correlation value S and power ratio that correspond to any of the plurality of subcarriers. For example, a measurement unit, which is not shown here, measures the signal strength of the respective subcarriers and the processing-object determining unit 74 selects a subcarrier whose signal strength is large. Alternatively, a statistical processing, such as taking the average, is performed on a plurality of correlation values S and a plurality of power ratios R. And the correlation values S that have undergone the statistics processing and the power ratios R that have undergone the statistics processing are derived. Hereinafter, the correlation values S and power ratios R which have been determined by the processing-object determining unit 74 will be referred to as the correlation value S and power ratio R, also.

Figure 18:
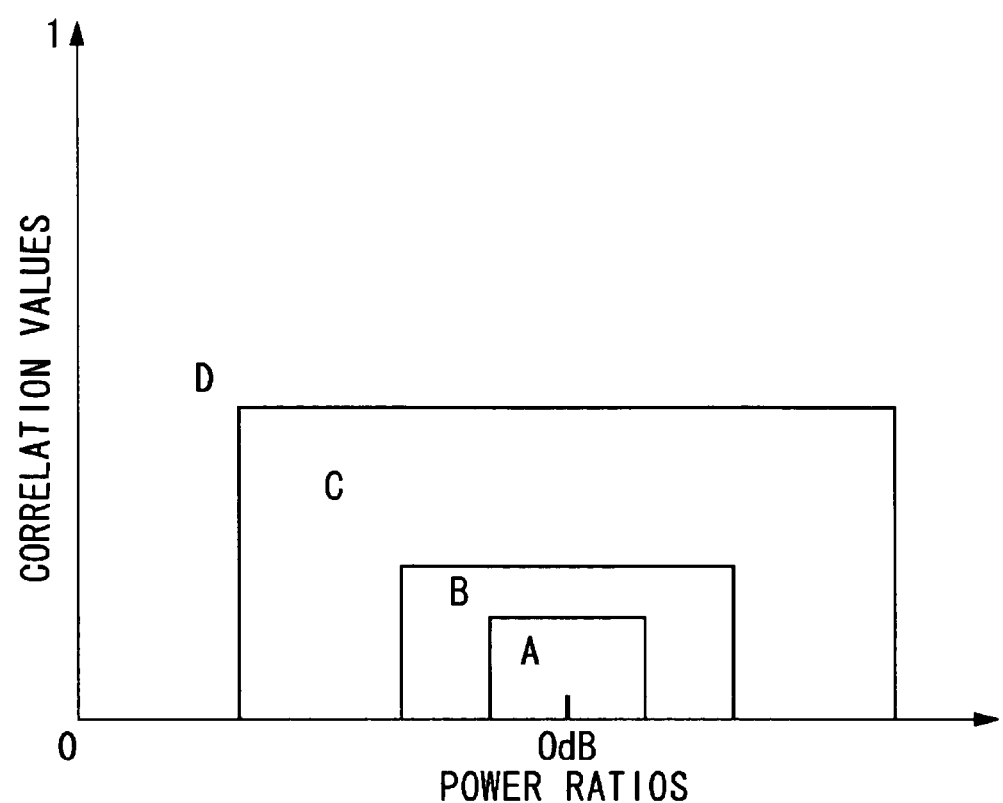
FIG. 18 illustrates a structure of criteria stored in a storage of FIG. 17.

Based on the correlation value S and the power ratio R from the processing-object determining unit 74, the rate determining unit 76 determines a data rate for data. In so doing, criteria stored in the storage 78 are referred to. FIG. 18 illustrates a structure of criteria stored in the storage 78. The criteria are so defined as to form a two-dimensional space by the correlation values and the power ratios, and the two-dimensional space is divided into a plurality of partial regions, namely, "A", "B", "C" and "D" as shown in FIG. 18. Here, the plurality of partial regions constituted by the regions "A", "B", "C" and "D" each corresponds to a predetermined data rate. For example, when the partial regions are associated with the number of antennas 12, the region "A" corresponds to "4" antennas, "B" to "3", "C" to "2" and "D" to "1".

It is to be noted that the modulation scheme and the coding rate may be defined in the similar manner, too, and by using this added combination thereof the two-dimensional space may be further divided into an added plurality of partial regions. Referring back to FIG. 17, the rate determining unit 76 associates the inputted correlation value S and the power ratio R with a criterion and then identifies a partial region that contains the inputted correlation value S and the power ratio R. Then the rate determining unit 76 derives a predefined data rate from the identified partial region. Upon acceptance of a rate request signal, the control unit 30 carries out the above processing. When the rate information is transmitted, the determined data rate is included in this rate information.

The rate determining unit 76 may determine a data rate for data, based on either the correlation value S or power ratio R. In such a case, the processing can be simplified.

In the embodiments described so far, when the training signals are transmitted, "MIMO-LTSs" are transmitted from antennas 12 the number of which is larger than the number of antennas 12 that should transmit Data. Also, the number of antennas 12 that should transmit "MIMO-LTSs" is set regardless of the number of antennas 12 that should transmit Data. For example, in the case of FIG. 3B, "MIMO-LTSs" are transmitted from four antennas 12 whereas "Data" are transmitted from two antennas 12. Although in FIG. 3B the number of antennas 12 that should transmit "MIMO-STSs" is defined to be the number of antennas 12 that should transmit "MIMO-LTSs", the number of antennas 12 that should transmit "MIMO-STSs" may be defined to be the number of antennas that should transmit "Data". In other words, in the case of FIG. 3B, "MIMO-STSs" may be transmitted from the first antennas 12a and the second antenna 12b only.

A description will be given here of a case where the number of antennas 12 that should transmit "MIMO-LTSs" is set according to the number of antennas 12 that should transmit Data. That is, the number of streams to which "MIMO-LTS" is assigned is so defined as to be greater than the number of streams to which "Data" is assigned, by a predetermined value. For example, assume that the number of antennas 12 that should transmit "MIMO-LTS" is defined to be the number such that "1" is added to the number of antennas 12 that should transmit "Data". A value other than "1" may also be added. For example, if the number of antennas 12 that should transmit "Data" is "2", the first radio apparatus 10a sets the number of antennas 12 that should transmit "MIMO-LTSs" to "3" before transmitting them. On the other hand, the radio apparatus 10 receiving the training signals generates the rate information within a range of not the number of antennas 12 at which "Data" were sent but the number of antennas 12 at which "MIMO-LTSs" were sent. That is, the data rate feasible in the range of the number of antennas 12, namely, "3", is produced as the rate information.

Based on the accepted rate information, the first radio apparatus 10a sets the number of antennas 12 by which "Data" are transmitted. In so doing, if the number of antennas 12 to be set is larger than the number of antennas 12 used so far, repeating the aforementioned processing will increase stepwise the number of antennas 12 that should transmit "Data". With this increase, the number of antennas 12 that should transmit "MIMO-LTSs" will be increased, too.

Figure 19A:
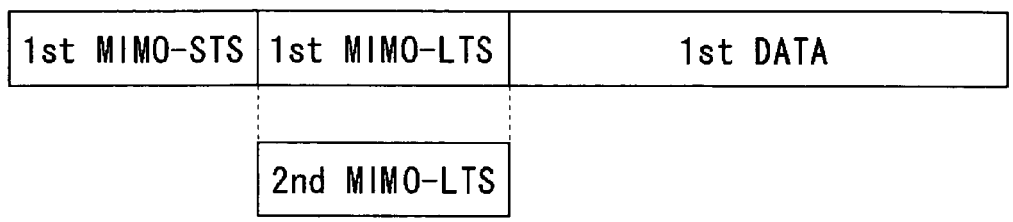
FIGS. 19A to 19C illustrate another structures of burst format in the communication system of FIG. 2.
Figure 19B:
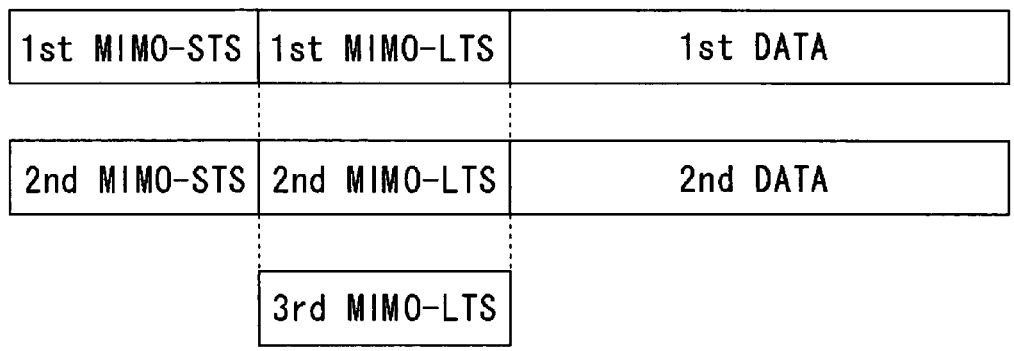
Figure 19C:
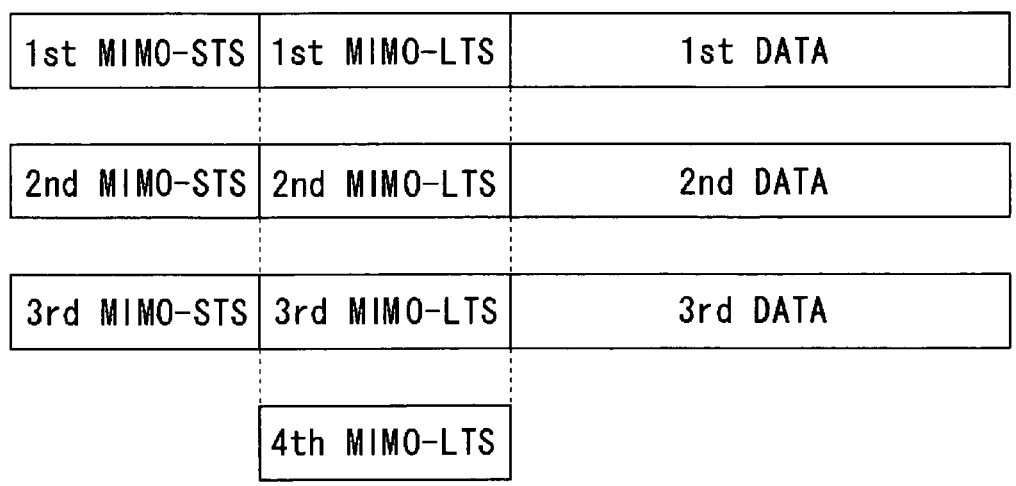

FIGS. 19A to 19C illustrate another structures of burst format in the communication system 100. FIG. 19A shows a burst format in a case where the number of streams for "Data" is "1". As shown in FIG. 19A, "Data" of one stream is assigned to a posterior part of the burst signal. "MIMO-LTSs" whose number of streams is greater than the number of streams for "Data" are assigned anterior to the "Data". It is to be noted that the number of streams for "MIMO-STS" is so defined as to be equal to the number of streams for "Data". "Legacy-STS" and the like shown in FIGS.3A and 3B are omitted here. FIG. 19B shows a burst format in a case where the number of streams for "Data" is "2". As shown in FIG. 19B, "Data" of two streams are arranged. The relationship between the number of streams for "MIMO-LTS" and the number of streams for "Data" is the same as that in FIG. 19A. FIG. 19C shows a burst format in a case where the number of streams for "Data" is "3". In this manner, as the format of a burst signal transmitted from the first radio apparatus 10a makes gradual transition from FIG. 19A toward FIG. 19C in an incremental manner, the number of training signals also increases.

In the first radio apparatus 10a, the radio units 20 and the like transmit the burst signals, as shown in FIGS. 19A to 19C, to the second radio apparatus 10b. The number of streams used for "Data" may be the number of streams for "Data" which has been used so far. The control unit 30 receives rate information from the second radio apparatus 10b via the radio unit 20 and the like. In particular, the rate information contains notification about the number of streams for Data receivable.

Furthermore, based on the rate information, the control unit 30 determines the number of streams to which "Data" is assigned and the number of streams to which "MIMO-LTS" is assigned. That is, based on the number of streams of Data receivable, the control unit 30 determines the number of streams to which "Data" is assigned. For instance, the control unit 30 so determines the number of streams, to which "Data" is assigned, as to be equal to the number of streams for Data receivable. Also, as described earlier, the control unit 30 determines, as the number of streams to which "MIMO-LTS" is assigned, the number such that "1" is added to the number of streams to which "Data" is assigned. That is, in the control unit 30, the number of streams to which "MIMO-LTS" is assigned is so defined as to increase and decrease according to increase and decrease of the number of streams to which Data is assigned. The modem unit 24, the processing unit 22 and the like generate burst signals based on a decision made by the control unit 30 and transmit the thus generated burst signals.

In the second radio apparatus 10b, the radio unit 20 and the like receive the burst signals from the first radio apparatus 10a. In the control unit 30, the number of streams to which "MIMO-LTS" is assigned is acquired based on the burst signal. This acquired number corresponds to the number such that "1" is added to the number of streams to which "Data" is assigned.

The control unit 30 derives the quality of a received burst signal. Here, the bit error rate, for example, may be derived as the quality of a burst signal. The quality may be derived by a structure as shown in FIG. 17. The control unit 30 determines the number of streams for data receivable, in a range of the acquired number of streams. In other words, based on the quality thereof, the control unit 30 determines the number of streams for data receivable, with the number of streams to which "MIMO-LTS" is assigned being as the upper limit. To determine this, a certain criterion as shown in FIG. 18 may be determined in advance. Note that the thus determined number of streams for data receivable serves as the rate information. The radio unit 20 and the like convey the number of streams for data determined by the determining unit, to a radio apparatus 10 to be communicated with.

Figure 20:
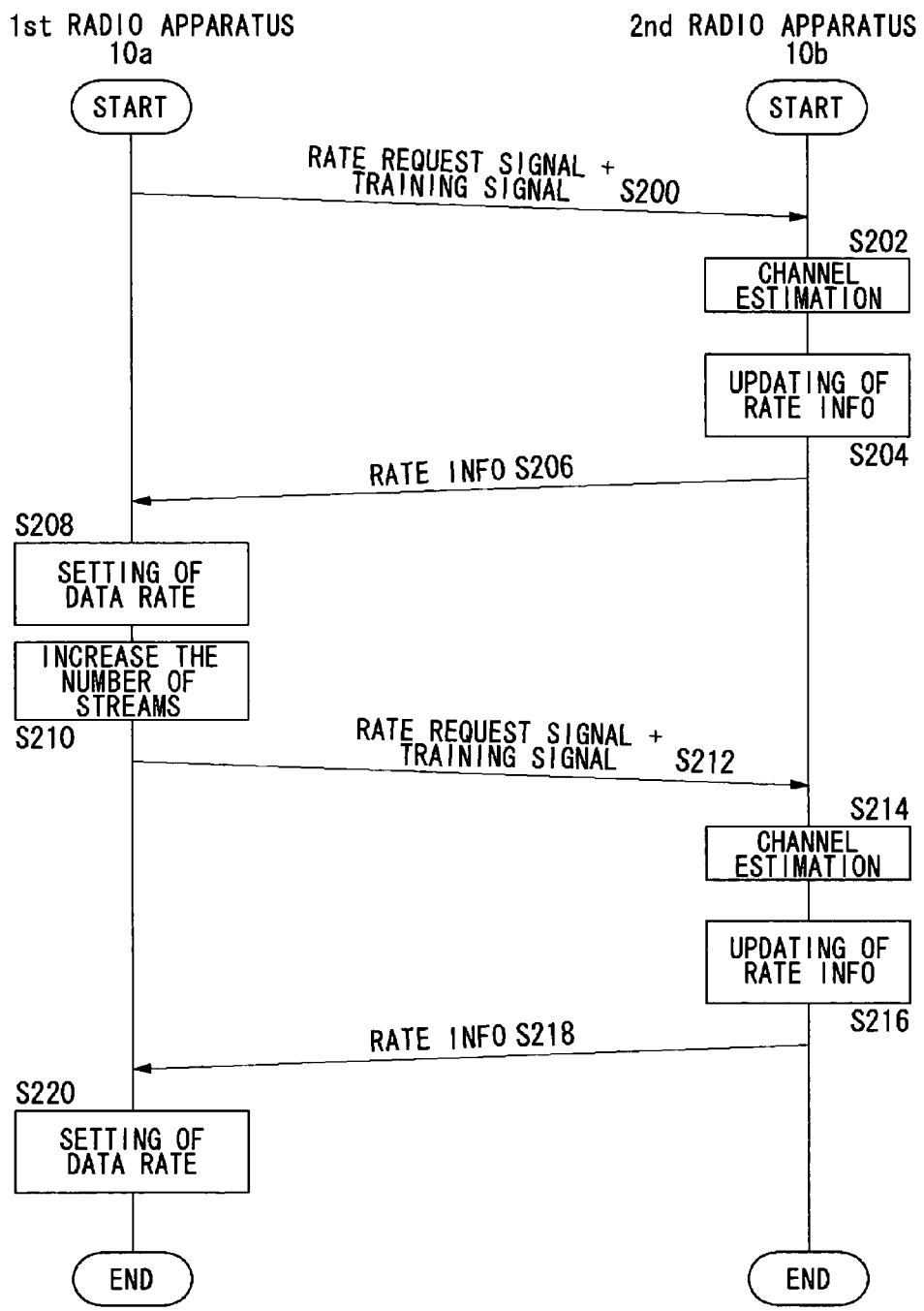
FIG. 20 is a sequence diagram showing a procedure of setting data rates in correspondence to the burst formats shown in FIGS. 19A to 19C.

FIG. 20 is a sequence diagram showing a procedure of setting data rates in correspondence to the burst formats shown in FIGS. 19A to 19C. The first radio apparatus 10a transmits to the second radio apparatus 10b a rate request signal and training signals (S200). It is then assumed that "Data" of one stream as shown in FIG. 19A is being transmitted. The second radio apparatus 10b estimates a channel based on the training signals (S202). Here, the channel estimation corresponds to deriving the aforementioned receiving weight vectors. The second radio apparatus 10b updates the rate information, based on the estimated channel (S204). Note that since the second radio apparatus 10b detects "MIMO-LTSs" assigned to two streams, the rate information is determined where the two streams is the upper limit. It is assumed here that rate information corresponding to two streams is determined. The second radio apparatus 10b transmits the rate information to the first radio apparatus 10a (S206). The first radio apparatus 10a sets a data rate by referring to the received rate information (S208). Based on the set data rate, the first radio apparatus 10a increases the number of streams for transmitting Data (S210). That is, the number of streams that should be used to transmit Data increases from "1" to 2".

The first radio apparatus 10a transmits a rate request signal and training request signals to the second radio apparatus 10b (S212). It is then assumed that "Data" of two streams are being transmitted. The second radio apparatus 10b estimates a channel based on the training signals (S214). The second radio apparatus 10b updates the rate information, based on the estimated channel (S216). Note that since the second radio apparatus 10b detects "MIMO-LTSs" assigned to three streams, the rate information is determined where the three streams is the upper limit. It is assumed here that rate information corresponding to three streams is determined. The second radio apparatus 10b transmits the rate information to the first radio apparatus 10a (S218). The first radio apparatus 10a sets a data rate by referring to the received rate information (S220).

Figure 21:
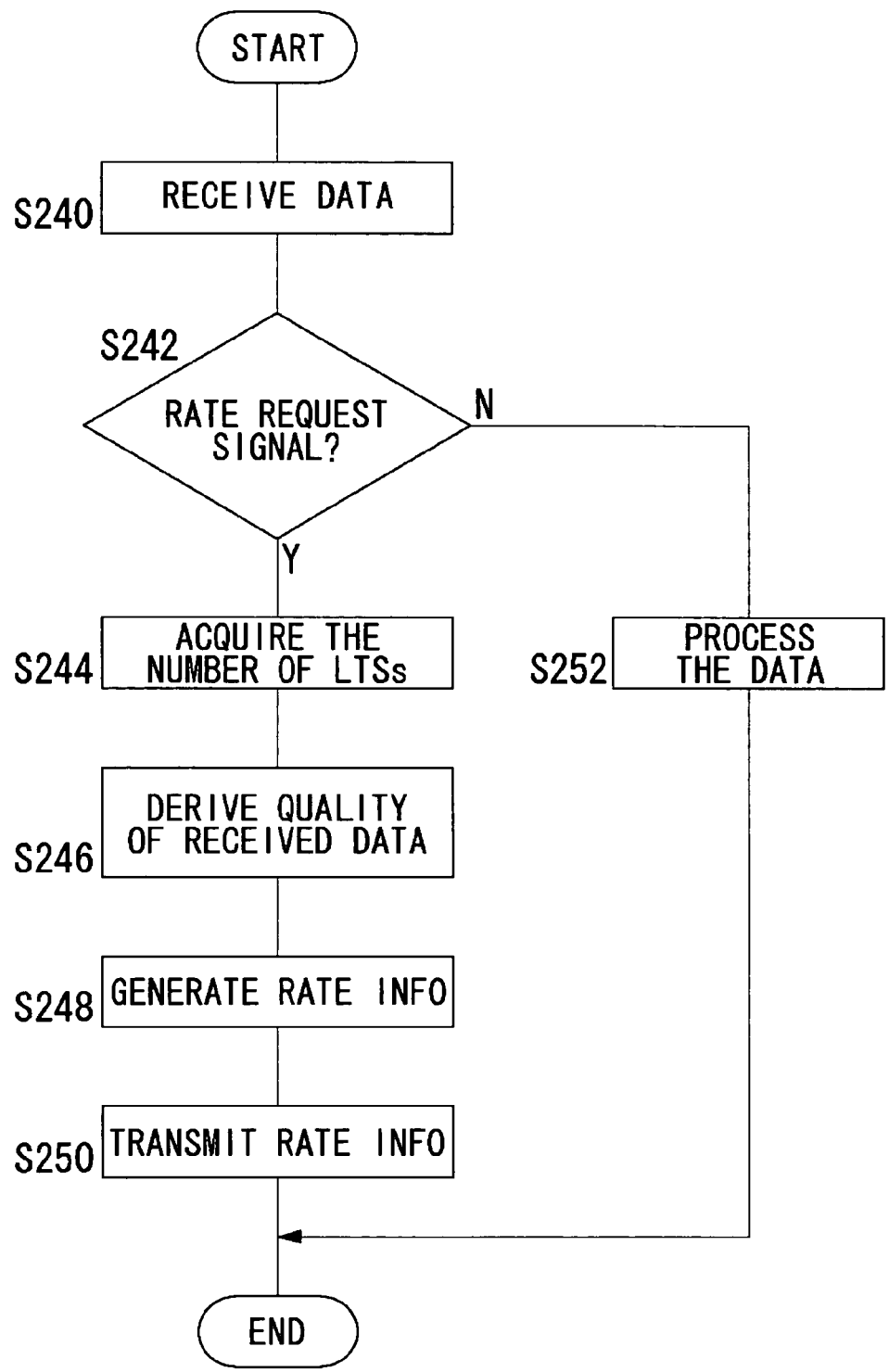
FIG. 21 is a flowchart showing a procedure of setting a data rate in the second radio apparatus of FIG. 20.

FIG. 21 is a flowchart showing a procedure of setting a data rate in the second radio apparatus 10b of FIG. 20.

The radio unit 20 receives data (S240). If the received data is a rate request signal (Y of S242), the control unit 30 acquires the number of streams for MIMO-LTS (S244). The control unit 30 derives the quality of the received data (S246). Based on the quality, the control unit 30 generates rate information, with the acquired number of streams as an upper limit (S248). The radio unit 20 transmits the rate information (S250). If, on the other hand, the received data is not a data request signal (N of S242), the modem unit 24 processes the data (S252).

Figure 22:
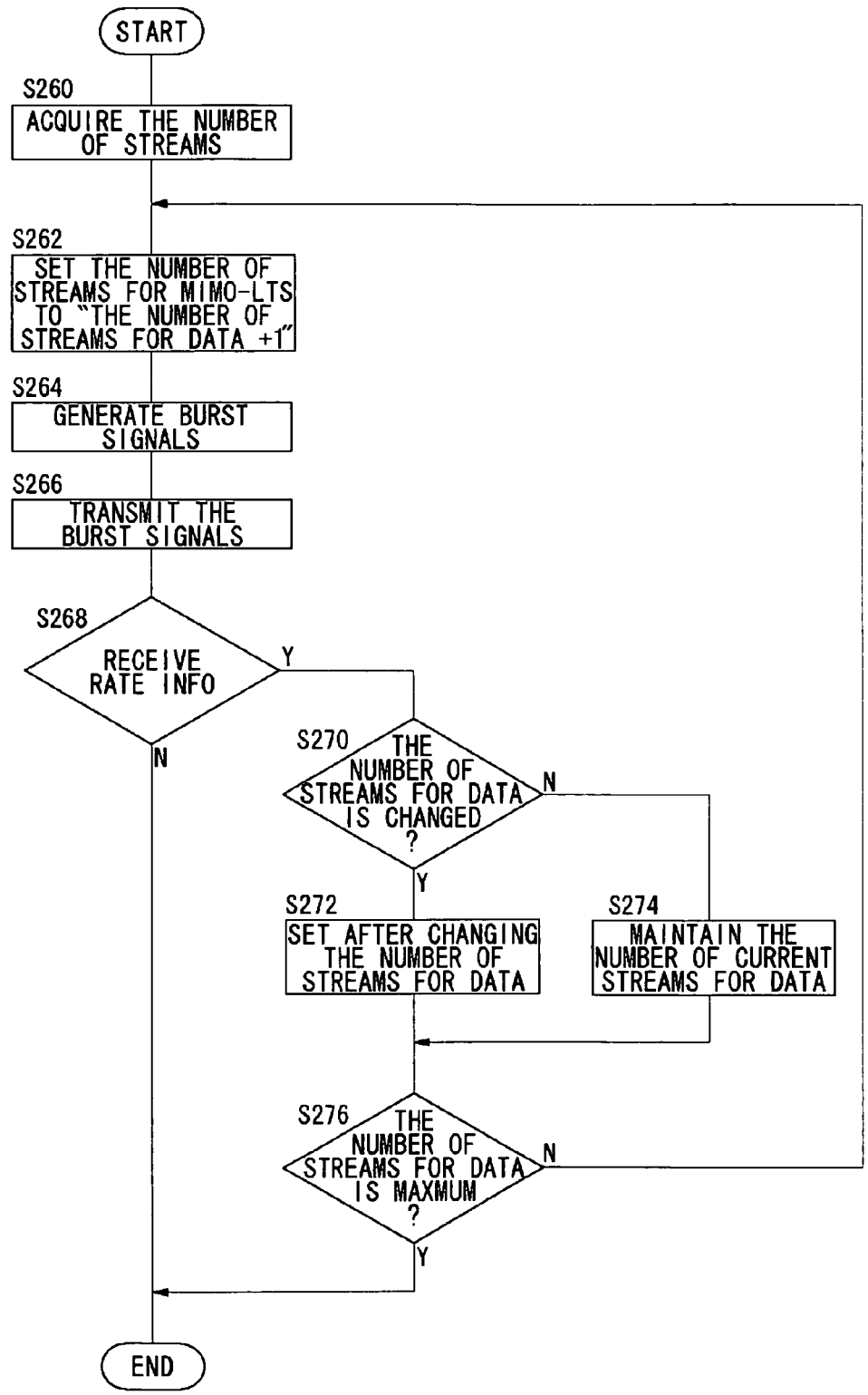
FIG. 22 is a flowchart showing a procedure of setting a data rate in the first radio apparatus of FIG. 20.

FIG. 22 is a flowchart showing a procedure of setting a data rate in the first radio apparatus 10a. The control unit 30 acquires the number of streams for Data from the rate information (S260), and then sets the number of streams for "MIMO-LTS" equal to "the number of streams for Data +1" (S262). The modem unit 24 and the like generate burst signals (S264) and then the radio unit 20 transmits the burst signals (S266). The control unit 30 receives the rate information (Y of S268). If the number of streams for Data has been changed (Y of S270), the control unit 30 changes the number of streams for Data before setting it (S272). If the number of streams for Data has not been changed (N of S270), the control unit 30 retains the current number of streams (S274). If the number of streams for Data is not the maximum value (N of S276), return to Step 262. If the control unit 30 does not receive the rate information (N of S268) or the number of streams for Data is the maximum value (Y of S276), the processing is terminated.

In the description given so far, it was assumed that the number of streams equals the number of antennas. Now, the modifications to the burst formats of FIGS. 19A to 19C will be described. The radio apparatus 10 generates burst signals of a plurality of streams, similar to those shown in FIGS. 19A to 19C, which contain MIMO-STS assigned to at least one of a plurality of streams, MIMO-LTS assigned to a plurality of streams and Data assigned to the same streams as those to MIMO-STS. Furthermore, the radio apparatus 10 multiplies a steering matrix by MIMO-STS and Data, respectively so as to increase MIMO-STS and Data up to the number of a plurality of streams. The transmitting apparatus also multiplies a steering matrix by MIMO-LTS. In what is to follow, a burst signal of a plurality of streams that has been multiplied by a steering matrix will be called "a burst signal of a plurality of streams" (namely, "a burst signal of multiple streams") also as before without distinguishing therebetween.

It is to be noted that the aforementioned steering matrix contains therein a component in which a time shifting is cyclically executed for each stream. The cyclically executed time shift is the so-called CDD (Cyclic Delay Diversity), and the cyclic time shifting is performed on MIMO-STS and the like. The similar processing is performed on MIMO-LTS and Data as well. The time-shift amounts differ for each burst signal of a plurality of streams. According to the processing described as above, the radio apparatus 10 deforms a burst signal of a plurality of streams and transmits the burst signal of a plurality of deformed streams from a plurality of antennas 12, respectively.

Problems associated with the embodiments as above may be expressed as follows. Want to transmit MIMO-STS, MIMO-LTS and Data evenly from all of the antennas 12 even if the number of streams for Data is less than the number of antennas 12. Want to uniformize the load of transmitting amplifiers connected respectively to a plurality of antennas 12. Want to transmit the training signals by such a burst format as to improve the accuracy of channel estimation in a targeted radio apparatus. Want to transmit the training signals by such a burst format as to improve the accuracy of rate information in a targeted radio apparatus. Want to transmit data by such a burst format as to prevent the deterioration of communication quality of data even in a case when these training signals are transmitted. Want to utilize the training signals to have the data received.

Figure 23:
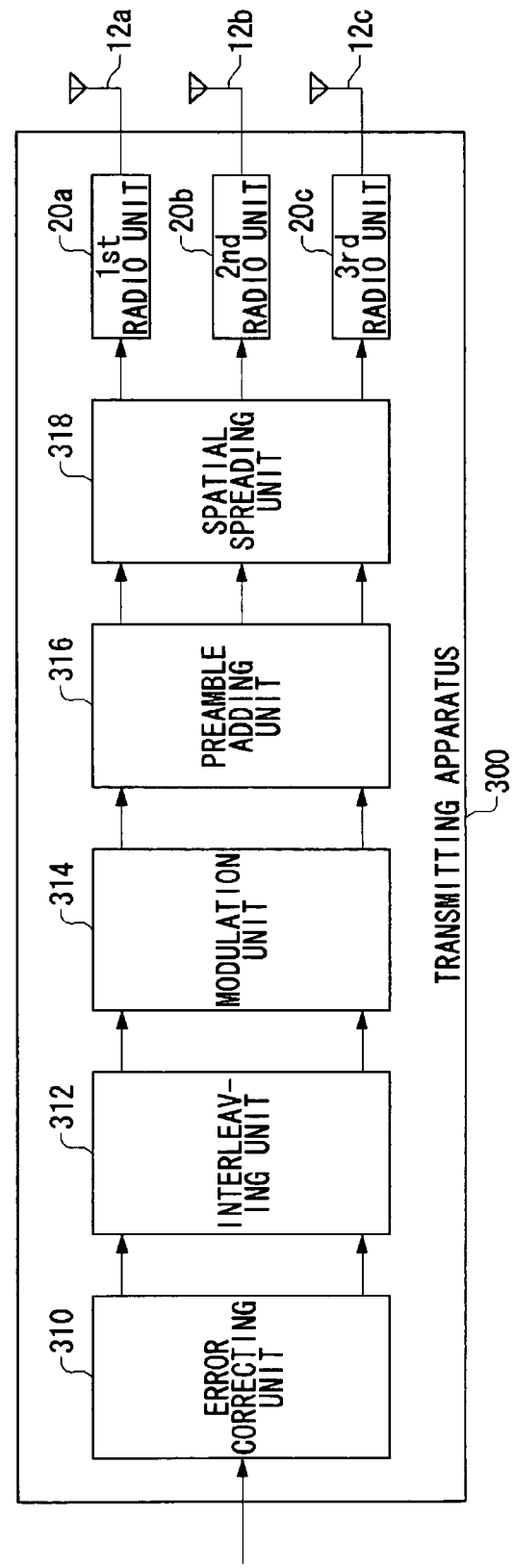
FIG. 23 shows a structure of transmitting apparatus that transmits a burst format modified over the burst formats of FIGS. 19A to 19C.

FIG. 23 shows a structure of transmitting apparatus that transmits a burst format modified over the burst formats of FIGS. 19A to 19C. Here, a transmitting apparatus 300 shown in FIG. 23 corresponds to part of the first radio apparatus 10a shown in FIG. 6. The transmitting apparatus 300 includes an error correcting unit 310, an interleaving unit 312, a modulation unit 314, a preamble adding unit 316, a spatial spreading unit 318, a first radio unit 20a, a second radio unit 20b and a third radio unit 20c, which are generically referred to as "radio unit 20", and a first antenna 12a, a second antenna 12b and a third antenna 12c, which are generically referred to as "antennas 12".

The error correcting unit 310 carries out coding for error correction. Here, the convolutional coding is carried out and the coding rate thereof is selected from among predefined values. The interleaving unit 312 interleaves data on which the convolutional coding has been performed. The interleaving unit 312 separates data into a plurality of streams before outputting the data. Here, suppose that the data are separated into two stream as shown in FIG. 19B. The data of two streams are mutually independent from each other.

The modulation unit 314 modulates Data of two streams, respectively. The preamble adding unit 316 appends a preamble to the modulated data. For that purpose, the preamble adding unit 316 stores MIMO-STSs, MIMO-LTSs and so forth as preambles. The preamble adding unit 316 generates a burst signal, composed of a plurality of streams, that contains MIMO-STSs and MIMO-LTSs assigned respectively to a plurality of streams and Data assigned to at least one of the plurality of streams. As described earlier, Data are formed by two streams. It is now assumed herein that the number of a plurality of streams is "3". Thus, MIMO-LTSs are assigned to a burst signal of three streams, and MIMO-STS and Data are assigned respectively to two of the three streams in the burst signal of three streams. As a result, a burst signal of three streams is outputted from the preamble adding unit 316.

Though the detailed description of MIMO-STS is omitted here, MIMO-STS corresponding to at least one of a plurality of streams in a burst signal of a plurality of streams may, for example, be so defined as to use subcarriers at least part of which differs from those corresponding to a burst signal of other streams. MIMO-STSs may be defined in a manner such that the number of subcarriers to be used for each MIMO-STS is the same and mutually different subacarriers are used. As described earlier, each burst signal of a plurality of streams uses a plurality of subcarriers, and the tone interleaving is carried out among MIMO-LTSs assigned in a burst signal of a plurality of streams.

The spatial spreading unit 318 multiplies, by a steering matrix each, a burst signal of a plurality of streams so as to generate the MIMO-LTSs multiplied by the steering matrix and the data whose count has been increased to the number of a plurality of streams. Before the multiplication, the spatial spreading unit 318 extends the degree of inputted MIMO-STS and data up to the number of a plurality of streams. The number of inputted MIMO-STS and data is "2" and is represented here by "Nin". Hence, the inputted data is expressed by a vector "Nin×1". The number of a plurality of streams is "3" and is represented here by "Nout". The spatial spreading unit 318 extends the degree of inputted data from Nin to Nout. That is, the vector "Nin×1" is extended to a vector "Nout×1". In so doing, "0's" are inserted to components from (Nin+1)th row to Nout–th row.

A steering matrix S is expressed by the following Equation (7).

$$S(\lambda) = C(\lambda)W \quad (7)$$

The steering matrix is a matrix of "Nout×Nout". W is an orthogonal matrix of "Nout×Nout". One example of the orthogonal matrices is Walsh matrix. Here, "λ" indicates the subcarrier number, and the multiplication by the steering matrix is carried out on a subcarrier-by-subcarrier basis. C is expressed by the following Equation (8) and is used for CDD.

$$C(\lambda) = \text{diag}(1, \exp(-j2\pi\lambda\delta/N\text{out}), \Lambda, \exp(-j2\pi\lambda\delta(N\text{out}-1)/N\text{out})) \quad (8)$$

In Equation (8), δ indicates a shift amount. That is, the spatial spreading unit 318 carries out, stream by stream, the cyclic time shifting in the MIMO-LTS multiplied by an orthogonal matrix, by a shift amount corresponding to each of a plurality of streams, and at the same time carries out, stream by stream, the cyclic time shifting in The MIMO-STS or the data whose count has been increased to the number of a plurality of streams. Note that the shift amount is set to a different value for each stream. As a result of the above processing, the spatial spreading unit 318 varies, modifies or deforms the structure of burst signals of a plurality of streams.

There are provided the radio units 20 the number of which is equal to the number of antennas 12. The radio unit 20 transmits the deformed burst signals of a plurality of streams. Then the radio unit 20 transmits the burst signals of a plurality of streams by associating them with a plurality of antennas 12. The radio unit 20 includes an IFFT unit, a GI unit, a quadrature modulation unit, a frequency conversion unit and an amplification unit, which are all not shown here. The IFFT unit performs IFFT (Inverse Fast Fourier Transform), thereby converting a frequency-domain signal using a plurality of subcarriers into a time-domain signal. The GI unit appends a guard interval to time-domain data. The quadrature modulation unit carries out quadrature modulation. The frequency conversion unit performs a frequency conversion by transforming a quadrature-modulated signal into a radio-frequency signal. The amplification unit is a power amplifier for amplifying radio-frequency signals. It is to be noted that the spatial spreading unit 318 may be provided in a position subsequent to the IFFT unit, not shown.

FIG. 24 illustrate a burst format modified or deformed over the burst formats of FIG. 19A to 19C. In particular, it is assumed here that the number of antennas 12 is "3" and the burst formats are varied, modified or deformed by the spatial spreading unit 318. When "First MIMO-STS" and "Second MIMO-STS" of FIG. 19B are multiplied by a steering matrix, they become MIMO-STSs of three streams, which are now indicated as "First MIMO-STS'" to "Third MIMO-STS'" in FIG. 24. When MIMO-LTSs are multiplied by a steering matrix, they become "MIMO-LTS's" which are now indicated as "First MIMO-LTS(1)'" to "Third MIMO STS(1)'" and so forth in FIG. 24. Similar to MIMO-STS, "First Data" and "Second Data" of FIG. 19B are deformed and now indicated as "First Data'" to "Third Data'".

According to the present embodiments, when a request signal is sent to a radio apparatus to be communicated, the training signals are transmitted from a plurality of antennas. Thus, the rate information, about a targeted radio apparatus, which has been generated based on the training signals can be obtained and therefore the degree of accuracy in rate information can be improved. The rate information is determined in consideration of the effect of various channels by using the training signals, so that the degree of accuracy in rate information can be improved.

Since the request signal and the training signals are transmitted consecutively, the most recent rate information can be obtained. Since the latest updated rate information can be acquired, the error in rate information can be made small even if a channel fluctuates. Moreover, when information on the data rate of a targeted radio apparatus is needed, the request signal is transmitted. Thus, even if the rate information is not transmitted on a periodic basis, accurate rate information can be obtained. With the improved accuracy of rate information, the occurrence of data error is reduced and the accuracy of control in transmitting data can be improved. Since the rate request signal and the training signals are transmitted in a combined manner, the deterioration of effective data rate can be prevented.

Since the number of antennas that should transmit training signals is reduced, the power consumption can be reduced. The antennas to be used for a communication transmit the training signals, so that the deterioration of characteristics can be suppressed. Since the power consumption can be reduced, the operable period can be extended even if the radio apparatus is powered by a battery. Since the power consumption can be reduced, the radio apparatus can be made smaller in size. Since antennas that have higher signal strength are preferentially selected, the deterioration of quality in data transmission can be prevented. Since antennas are selected according to the wireless quality, the deterioration of quality in data transmission can be prevented while reducing the power consumption. The known signals are transmitted from antennas that should transmit data, so that the deterioration of transmission weight vectors derived in a radio apparatus to be communicated is prevented. Also, antennas that should transmit data are selected, so that the power consumption is reduced. Since the derived transmission weight vectors are accurately produced, the degradation in antenna directivity can be prevented.

The beamforming is carried out at the time of transmitting the training signals, so that the signal strength at a targeted radio apparatus can be raised and the information on a rate having faster values can be obtained. The beamforming is also executed at the time of actually transmitting the data, so that a data rate suited for the occasion of a data rate transmission can be obtained. When a data rate is determined, the values of correlation among the receiving response vectors and the ratios in strength among receiving response vectors are taken into account, so that the effect among signals transmitted respectively from a plurality of antennas can be reflected. The degree of accuracy of the determined rate information can be improved. In a MIMO system, when the correlation value becomes smaller, the channel characteristics improve. Also, when the strength ratio becomes smaller, they improve. Thus, the data rate can be so determined as to reflect such characteristics. The decision based on the correlation values and strength ratios can be applied to a system in which a plurality of carriers are used. When the training signals are received, the rate request signal is also received. Thus, the rate information determined can be communicated and the highly accurate rate information can be provided.

According to the present embodiments, the information rate, such as the number of streams for data receivable, in particular, is determined within a range of the number of streams where MIMO-LTSs are assigned. Hence, the sudden increase in the number of streams for data can be prevented and therefore a possibility that the increase in the number of streams for data fails can be restricted. Since the number of streams for data is increased by one at a time, the abrupt change in electric power can be restricted. Since the number of streams to which MIMO-LTS is assigned is related, under a predetermined relationship, to the number of streams to which Data are assigned, the difference in signal strength therebetween can be made smaller. Since the difference in signal strength between MIMO-LTS and Data is made smaller, the degradation in the receiving quality of data can be prevented even in a case when the number of streams for MIMO-STS is made equal to that for MIMO-LTS. Since the difference in signal strength between MIMO-LTS and Data is made smaller, the degradation in channel estimation can be suppressed even in a case when the number of streams for MIMO-STS is made equal to that for Data. Since the number of streams to which MIMO-LTS is assigned is set as an upper limit, the sudden increase in the number of streams for Data can be prevented.

According to the present embodiments, even if the number of Data streams is less than the number of MIMO-LTS streams, the multiplication by orthogonal matrices and the cyclic time shift processing are carried out. As a result thereof, the number of Data streams can be made equal to the number of MIMO-LTS streams. MIMO-LTS also undergoes the same processing as with Data streams. Thus, the radio apparatus to be communicated can use MIMO-LTS at the time of receiving the Data. Since MIMO-LTS is transmitted from all of antennas, the receiver side can estimate the channels for all of the antennas. Even if the number of data streams is not equal to the number of antennas, signals can be evenly transmitted from all of the antennas by performing the Walsh matrices and CDD processing on data. The receiving power of the data can be adjusted to MIMO-LTS.

The present invention has been described based on the embodiments. These embodiments are merely exemplary, and it is understood by those skilled in the art that various modifications to the combination of each component and process thereof are possible and that such modifications are also within the scope of the present invention.

According to the present embodiments, the selector 28 selects preferentially an antenna 12 whose strength of a signal received is larger. However, the present invention is not limited thereto and, for example, a delay spread may be derived for each antenna 12 and an antenna 12 whose delay spread is smaller may be preferentially selected. According to this modification, an antenna 12 having less effect of delayed waves can be preferentially selected. That is, it is only necessary that an antenna 12 having a satisfactory radio quality is preferentially selected.

According to the present embodiments, the first radio apparatus 10a controls so that the number of antennas 12 to be used when the training signals are transmitted is equal to the number of antennas 12 to be used when the training signals are received. However, the present invention is not limited thereto and, for example, a control may be exercised in a manner that those numbers differ. That is, the processing unit 22 receives training signals for use in receiving, from the second radio apparatus 10b via a plurality of antennas 12, and the selector 28 selects at least one antenna 12, among a plurality of antennas 12, that should transmit the training signals. In so doing, the selector 28 may derive radio qualities corresponding respectively to a plurality of antennas 12, based on the received training signals for use in receiving and then select preferentially antennas whose wireless qualities are desirable. According to this modification, the number of transmitting antennas 12 and the number of receiving antennas 12 can be set independently from each other.

While the preferred embodiments of the present invention have been described using specific terms, such description is for illustrative purposes only, and it is to be understood that changes and variations may be made without departing from the spirit or scope of the appended claims.

What is claimed is:

1. A radio apparatus, comprising:
    a receiver which receives, from a radio apparatus to communicate with, a burst signal that comprises (1) first known signal(s) operative in a MIMO system assigned to N of M streams (N<M), (2) second known signals operative in the MIMO system assigned to the respective M streams, and (3) data assigned to the N of M streams, the N of M streams including the first known signal, the second known signal, and the data in that order;
    an acquiring unit which acquires, based on the burst signal received by said receiver, the number of streams in which second known signals are assigned;
    a decision unit which determines rate information in a range of the number of streams acquired by said acquiring unit, the rate being increased or decreased according to an increase or decrease of the number of streams; and
    a notification unit which notifies the radio apparatus to communicate with of the rate information determined by said decision unit.

2. A radio apparatus according to claim 1, wherein in the burst signal received by said receiver the number of streams to which the second known signals are assigned is so defined as to be greater than that to which the data are assigned, by a fixed value, and the number of streams to which the second known signals are assigned is so defined as to increase or decrease according to an increase or decrease of the number of streams to which the data are assigned, while maintaining the fixed value.

3. A radio apparatus according to claim 1, further comprising a derivation unit which derives a quality of the burst signal received by said receiver,
    wherein said decision unit determines the rate information reflecting the quality derived by said derivation unit, in a manner such that the number of streams acquired by said acquiring unit is the upper limit value.

4. A radio apparatus, comprising:
    a transmitter which transmits, to a radio apparatus to communicate with, a burst signal that comprises (1) first known signal(s) operative in a MIMO system assigned to N of M streams (N<M), (2) second known signals operative in the MIMO system assigned to the respective M streams, and (3) data assigned to the N of M streams, the N of M streams including the first known signal, the second known signal, and the data in that order;
    a receive unit which receives, from the radio apparatus to communicate with, the burst signal and a notification on rate information that is derived by the radio apparatus to communicate with, and corresponds to the number of streams receivable by the radio apparatus to communicate with;
    a decision unit which determines, based on the notification received by said receive unit, the number of streams to which data are assigned and the number of streams to which second known signals are assigned; and
    a generator which generates a burst signal based on a decision made by said decision unit and outputs the generated burst signal to said transmitter.

5. A radio apparatus according to claim 4, wherein in said decision unit the number of streams to which the second known signals are assigned is so defined as to be larger, by a fixed number, than the number of streams to which the data are assigned, and after the number of streams to which the data are assigned is determined based on the notification received by said receive unit, the number of streams to which the second known signals are assigned is determined by adding the fixed value to the number of streams to which the data are assigned.

6. A control method, comprising:
    receiving, from a radio apparatus to communicate with, a burst signal that comprises (1) first known signal(s) operative in a MIMO system assigned to N of M streams (N<M), (2) second known signals operative in the MIMO system assigned to the respective M streams, and (3) data assigned to the N of M streams, the N of M streams including the first known signal, the second known signal, and the data in that order;
    acquiring, based on the burst signal received by said receiving, the number of streams to which second known signals are assigned;
    determining rate information in a range of the number of streams acquired by said acquiring, the rate being increased or decreased according to an increase or decrease of the number of streams; and
    notifying the radio apparatus to be communicated of the rate information determined by said determining.

7. A control method according to claim 6, wherein in the burst signal received by said receiving the number of streams to which the second known signals are assigned is so defined as to be greater than that to which the data are assigned, by a fixed value, and the number of streams to which the second known signals are assigned is so defined as to increase or decrease according to an increase or decrease of the number of streams to which the data are assigned, while maintaining the fixed value.

8. A control method according to claim 6, wherein said receiving further includes deriving a quality of the burst signal received by said receiving, and
wherein said determining is such that the rate information is determined, reflecting the quality derived by said deriving, in a manner such that the number of streams acquired by said acquiring is the upper limit value.

9. A control method, comprising:
transmitting, to a radio apparatus to communicate with, a burst signal that comprises (1) first known signal(s) operative in a MIMO system assigned to N of M streams (N<M), (2) second known signals operative in the MIMO system assigned to the respective M streams, and (3) data assigned to the N of M streams, the N of M streams including the first known signal, the second known signal, and the data in that order;
receiving, from the radio apparatus to communicate with, the burst signal and a notification on rate information that is derived by the radio apparatus to communicate with, and corresponds to the number of streams receivable by the radio apparatus to communicate with;
determining, based on the notification received by said receiving, the number of streams to which data are assigned and the number of streams to which second known signals are assigned; and
generating a burst signal based on a decision made by said determining and outputting the generated burst signal to said transmitting.

10. A control method according to claim 9, wherein in said determining the number of streams to which the second known signals are assigned is so defined as to be larger, by a fixed number, than the number of streams to which the data are assigned, and after the number of streams to which the data are assigned is determined based on the notification received by said receiving, the number of streams to which the second known signals are assigned is determined by adding the fixed value to the number of streams to which the data are assigned.

* * * * *